US008959459B2

(12) United States Patent
Aoki et al.

(10) Patent No.: US 8,959,459 B2
(45) Date of Patent: Feb. 17, 2015

(54) GESTURE SENSING ENHANCEMENT SYSTEM FOR A WAGERING GAME

(75) Inventors: Dion K. Aoki, Chicago, IL (US); Timothy T. Gronkowski, Chicago, IL (US); Joel R. Jaffe, Glenview, IL (US); Timothy C. Loose, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 418 days.

(21) Appl. No.: 13/524,180

(22) Filed: Jun. 15, 2012

(65) Prior Publication Data

US 2012/0322527 A1 Dec. 20, 2012

Related U.S. Application Data

(60) Provisional application No. 61/497,311, filed on Jun. 15, 2011.

(51) Int. Cl.
*G06F 3/0481* (2013.01)
*G07F 17/32* (2006.01)
*G07F 17/34* (2006.01)

(52) U.S. Cl.
CPC ........ *G07F 17/3206* (2013.01); *G07F 17/3209* (2013.01); *G07F 17/34* (2013.01)
USPC ................. 715/863; 463/20; 463/16; 463/17; 463/18; 463/13

(58) Field of Classification Search
CPC ............................... G06F 3/0481; G07F 17/32
USPC .......................................................... 715/863
See application file for complete search history.

(56) References Cited

U.S. PATENT DOCUMENTS

| | | | |
|---|---|---|---|
| 3,533,628 | A | 10/1970 | Fisher |
| 4,357,488 | A | 11/1982 | Knighton et al. |
| 4,484,179 | A | 11/1984 | Kasday |
| 4,522,399 | A | 6/1985 | Nishikawa |
| 4,715,004 | A | 12/1987 | Kabasawa et al. |
| 4,746,770 | A | 5/1988 | McAvinney |
| 4,763,278 | A | 8/1988 | Rajasekaran et al. |

(Continued)

FOREIGN PATENT DOCUMENTS

| | | | | |
|---|---|---|---|---|
| AU | 199943487 A1 | 3/2000 | ................ | A63F 7/02 |
| EP | 309946 | 4/1989 | | |

(Continued)

OTHER PUBLICATIONS

Apple, "Iphone User Guide", iPhone iOS 3.1, released on Sep. 2009, 217 pages.*

(Continued)

*Primary Examiner* — Reza Nabi
(74) *Attorney, Agent, or Firm* — Nixon Peabody LLP

(57) ABSTRACT

A gaming system and a method for conducting a wagering game that allows accurate determination of a player gesture input. A gaming terminal for playing the wagering game including a controller is disclosed. A touch surface is provided for actuation by a player gesture associated with an input to the wagering game. A sensor array underlies the touch surface to sense the motion of the gesture. The sensor array is coupled to the controller. The controller determines a trajectory represented by the gesture based on the sensed motion from the sensor array. A display is coupled to the controller to display movement of an object image based on the trajectory represented by the gesture.

19 Claims, 7 Drawing Sheets

(56) References Cited

U.S. PATENT DOCUMENTS

| | | | | |
|---|---|---|---|---|
| 4,844,475 | A | 7/1989 | Saffer et al. | |
| 4,968,877 | A | 11/1990 | McAvinney et al. | |
| 5,133,017 | A | 7/1992 | Cain et al. | |
| 5,186,460 | A | 2/1993 | Fongeallaz et al. | |
| 5,259,613 | A | 11/1993 | Marnell, II | |
| 5,318,298 | A | 6/1994 | Kelly et al. | |
| 5,370,399 | A | 12/1994 | Liverance | |
| 5,444,786 | A | 8/1995 | Raviv | |
| 5,469,193 | A | 11/1995 | Giobbi et al. | |
| 5,469,510 | A | 11/1995 | Blind et al. | |
| 5,511,148 | A | 4/1996 | Wellner | |
| 5,524,888 | A | 6/1996 | Heidel | |
| 5,533,727 | A | 7/1996 | DeMar | |
| 5,542,669 | A | 8/1996 | Charron et al. | |
| 5,589,856 | A | 12/1996 | Stein et al. | |
| 5,655,961 | A | 8/1997 | Acres et al. | |
| 5,695,188 | A | 12/1997 | Ishibashi | |
| 5,704,836 | A | 1/1998 | Norton et al. | |
| 5,743,798 | A | 4/1998 | Adams et al. | |
| 5,762,552 | A | 6/1998 | Vuong et al. | |
| 5,770,533 | A | 6/1998 | Franchi | |
| 5,775,993 | A | 7/1998 | Fentz et al. | |
| 5,803,810 | A | 9/1998 | Norton et al. | |
| 5,807,177 | A | 9/1998 | Takemoto et al. | |
| 5,808,567 | A | 9/1998 | McCloud | |
| 5,816,918 | A | 10/1998 | Kelly et al. | |
| 5,828,768 | A | 10/1998 | Eatwell et al. | |
| 5,833,538 | A | 11/1998 | Weiss | |
| 5,851,148 | A | 12/1998 | Brune et al. | |
| 5,896,126 | A | 4/1999 | Shieh | |
| 5,941,773 | A | 8/1999 | Harlick | |
| 5,943,043 | A | 8/1999 | Furuhata et al. | |
| 5,946,658 | A | 8/1999 | Miyazawa et al. | |
| 5,971,850 | A | 10/1999 | Liverance | |
| 5,976,019 | A | 11/1999 | Ikeda et al. | |
| 6,067,112 | A | 5/2000 | Wellner et al. | |
| 6,068,552 | A | 5/2000 | Walker et al. | |
| 6,089,663 | A | 7/2000 | Hill | |
| 6,110,041 | A | 8/2000 | Walker et al. | |
| 6,162,121 | A | 12/2000 | Morro et al. | |
| 6,210,167 | B1 | 4/2001 | Nishiyama | |
| 6,217,448 | B1 | 4/2001 | Olsen | |
| 6,246,395 | B1 | 6/2001 | Goyins et al. | |
| 6,254,483 | B1 | 7/2001 | Acres | |
| 6,255,604 | B1 | 7/2001 | Tokioka et al. | |
| 6,280,328 | B1 * | 8/2001 | Holch et al. .................... | 463/42 |
| 6,283,860 | B1 | 9/2001 | Lyons et al. | |
| 6,302,790 | B1 | 10/2001 | Brossard | |
| 6,308,953 | B1 | 10/2001 | Nagano | |
| 6,315,666 | B1 | 11/2001 | Mastera et al. | |
| 6,364,314 | B1 | 4/2002 | Canterbury | |
| 6,416,411 | B1 | 7/2002 | Tsukahara | |
| 6,422,941 | B1 | 7/2002 | Thorner et al. | |
| 6,471,589 | B1 | 10/2002 | Nagano | |
| 6,517,433 | B2 * | 2/2003 | Loose et al. .................... | 463/20 |
| 6,530,842 | B1 | 3/2003 | Wells et al. | |
| 6,561,908 | B1 | 5/2003 | Hoke | |
| 6,607,443 | B1 | 8/2003 | Miyamoto et al. | |
| 6,620,045 | B2 | 9/2003 | Berman et al. | |
| 6,638,169 | B2 | 10/2003 | Wilder et al. | |
| 6,642,917 | B1 | 11/2003 | Koyama et al. | |
| 6,676,514 | B1 | 1/2004 | Kusuda et al. | |
| 6,677,932 | B1 | 1/2004 | Westerman | |
| 6,767,282 | B2 | 7/2004 | Matsuyama et al. | |
| 6,788,295 | B1 | 9/2004 | Inkster | |
| 6,819,312 | B2 | 11/2004 | Fish | |
| 6,856,259 | B1 | 2/2005 | Sharp | |
| 6,929,543 | B1 | 8/2005 | Ueshima et al. | |
| 6,932,706 | B1 | 8/2005 | Kaminkow | |
| 6,942,571 | B1 | 9/2005 | Mcallister et al. | |
| 6,995,752 | B2 | 2/2006 | Lu | |
| 7,077,009 | B2 | 7/2006 | Lokhorst et al. | |
| 7,147,558 | B2 * | 12/2006 | Giobbi ............................ | 463/25 |
| 7,204,428 | B2 | 4/2007 | Wilson | |
| 7,254,775 | B2 | 8/2007 | Geaghan et al. | |
| 7,294,059 | B2 | 11/2007 | Silva et al. | |
| 7,331,868 | B2 | 2/2008 | Beaulieu et al. | |
| RE40,153 | E | 3/2008 | Westerman et al. | |
| 7,379,562 | B2 | 5/2008 | Wilson | |
| 7,397,464 | B1 | 7/2008 | Robbins et al. | |
| 7,411,575 | B2 | 8/2008 | Hill et al. | |
| 7,479,065 | B1 | 1/2009 | McAllister et al. | |
| 7,479,949 | B2 * | 1/2009 | Jobs et al. ..................... | 345/173 |
| 7,936,341 | B2 | 5/2011 | Weiss | |
| 8,147,316 | B2 * | 4/2012 | Arezina et al. .................. | 463/20 |
| 8,312,392 | B2 * | 11/2012 | Forutanpour et al. ......... | 715/863 |
| 8,348,747 | B2 * | 1/2013 | Arezina et al. .................. | 463/20 |
| 8,727,881 | B2 * | 5/2014 | Ansari et al. .................... | 463/39 |
| 8,732,592 | B2 * | 5/2014 | Nielsen et al. ................ | 715/757 |
| 2002/0003919 | A1 | 1/2002 | Morimoto | |
| 2002/0013173 | A1 | 1/2002 | Walker et al. | |
| 2002/0037763 | A1 | 3/2002 | Idaka | |
| 2002/0090990 | A1 | 7/2002 | Joshi et al. | |
| 2002/0097223 | A1 | 7/2002 | Rosenberg | |
| 2002/0142825 | A1 | 10/2002 | Lark et al. | |
| 2002/0142846 | A1 | 10/2002 | Paulsen | |
| 2002/0151349 | A1 | 10/2002 | Joshi | |
| 2002/0173354 | A1 | 11/2002 | Winans et al. | |
| 2003/0045354 | A1 * | 3/2003 | Giobbi ............................ | 463/40 |
| 2003/0054881 | A1 | 3/2003 | Hedrick et al. | |
| 2003/0067447 | A1 | 4/2003 | Geaghan et al. | |
| 2003/0114214 | A1 | 6/2003 | Barahona et al. | |
| 2004/0001048 | A1 | 1/2004 | Kraus et al. | |
| 2004/0029636 | A1 | 2/2004 | Wells | |
| 2004/0029637 | A1 | 2/2004 | Hein, Jr. et al. | |
| 2004/0038721 | A1 | 2/2004 | Wells | |
| 2004/0053695 | A1 | 3/2004 | Mattice et al. | |
| 2004/0063482 | A1 | 4/2004 | Toyoda | |
| 2004/0166930 | A1 | 8/2004 | Beaulieu et al. | |
| 2004/0166937 | A1 * | 8/2004 | Rothschild et al. ............. | 463/36 |
| 2005/0059458 | A1 | 3/2005 | Griswold et al. | |
| 2005/0113163 | A1 | 5/2005 | Mattice et al. | |
| 2005/0202864 | A1 * | 9/2005 | Duhamel et al. ................ | 463/16 |
| 2005/0212754 | A1 * | 9/2005 | Marvit et al. ................. | 345/156 |
| 2005/0227217 | A1 | 10/2005 | Wilson | |
| 2005/0259378 | A1 | 11/2005 | Hill et al. | |
| 2006/0001652 | A1 | 1/2006 | Chiu et al. | |
| 2006/0010400 | A1 | 1/2006 | Dehlin et al. | |
| 2006/0025194 | A1 | 2/2006 | McInerny et al. | |
| 2006/0026521 | A1 * | 2/2006 | Hotelling et al. ............. | 715/702 |
| 2006/0026536 | A1 * | 2/2006 | Hotelling et al. ............. | 715/863 |
| 2006/0031786 | A1 * | 2/2006 | Hillis et al. ................... | 715/863 |
| 2006/0033724 | A1 | 2/2006 | Chaudhri et al. | |
| 2006/0073891 | A1 | 4/2006 | Holt | |
| 2006/0101354 | A1 | 5/2006 | Hashimoto et al. | |
| 2006/0164399 | A1 | 7/2006 | Cheston et al. | |
| 2006/0284874 | A1 | 12/2006 | Wilson | |
| 2006/0294247 | A1 | 12/2006 | Hinckley et al. | |
| 2007/0093290 | A1 | 4/2007 | Winans et al. | |
| 2007/0124370 | A1 | 5/2007 | Nareddy et al. | |
| 2007/0152984 | A1 | 7/2007 | Ording et al. | |
| 2007/0177803 | A1 | 8/2007 | Elias et al. | |
| 2007/0201863 | A1 | 8/2007 | Wilson et al. | |
| 2007/0236460 | A1 * | 10/2007 | Young et al. .................. | 345/169 |
| 2007/0236478 | A1 | 10/2007 | Geaghan et al. | |
| 2007/0247435 | A1 | 10/2007 | Benko et al. | |
| 2007/0270203 | A1 | 11/2007 | Aida | |
| 2008/0076506 | A1 * | 3/2008 | Nguyen et al. .................. | 463/16 |
| 2008/0158145 | A1 | 7/2008 | Westerman | |
| 2008/0158146 | A1 | 7/2008 | Westerman | |
| 2008/0158147 | A1 | 7/2008 | Westerman et al. | |
| 2008/0158168 | A1 | 7/2008 | Westerman et al. | |
| 2008/0158169 | A1 | 7/2008 | O'Connor et al. | |
| 2008/0158174 | A1 | 7/2008 | Land et al. | |
| 2008/0163130 | A1 | 7/2008 | Westerman | |
| 2008/0180654 | A1 | 7/2008 | Bathiche et al. | |
| 2008/0204426 | A1 * | 8/2008 | Hotelling et al. ............. | 345/173 |
| 2008/0211766 | A1 | 9/2008 | Westerman et al. | |
| 2008/0211775 | A1 * | 9/2008 | Hotelling et al. ............. | 345/168 |
| 2008/0211783 | A1 * | 9/2008 | Hotelling et al. ............. | 345/173 |
| 2008/0211784 | A1 * | 9/2008 | Hotelling et al. ............. | 345/173 |
| 2008/0211785 | A1 * | 9/2008 | Hotelling et al. ............. | 345/173 |
| 2008/0231610 | A1 * | 9/2008 | Hotelling et al. ............. | 345/173 |
| 2008/0231611 | A1 | 9/2008 | Bathiche et al. | |

(56) References Cited

U.S. PATENT DOCUMENTS

| | | | | |
|---|---|---|---|---|
| 2008/0300055 | A1* | 12/2008 | Lutnick et al. | 463/39 |
| 2008/0309631 | A1 | 12/2008 | Westerman et al. | |
| 2008/0309634 | A1 | 12/2008 | Hotelling et al. | |
| 2009/0002327 | A1 | 1/2009 | Wilson et al. | |
| 2009/0002344 | A1 | 1/2009 | Wilson et al. | |
| 2009/0005165 | A1* | 1/2009 | Arezina et al. | 463/37 |
| 2009/0021489 | A1 | 1/2009 | Westerman et al. | |
| 2009/0118001 | A1 | 5/2009 | Kelly et al. | |
| 2009/0118006 | A1 | 5/2009 | Kelly et al. | |
| 2009/0143141 | A1* | 6/2009 | Wells et al. | 463/37 |
| 2009/0191946 | A1 | 7/2009 | Thomas et al. | |
| 2009/0197676 | A1 | 8/2009 | Baerlocher et al. | |
| 2009/0325691 | A1* | 12/2009 | Loose | 463/30 |
| 2010/0124967 | A1 | 5/2010 | Lutnick et al. | |
| 2010/0130280 | A1* | 5/2010 | Arezina et al. | 463/20 |
| 2010/0313146 | A1* | 12/2010 | Nielsen et al. | 715/757 |
| 2010/0328201 | A1* | 12/2010 | Marvit et al. | 345/156 |
| 2011/0050569 | A1* | 3/2011 | Marvit et al. | 345/158 |
| 2011/0118013 | A1* | 5/2011 | Mattice et al. | 463/30 |
| 2011/0264272 | A1* | 10/2011 | Wu et al. | 700/275 |
| 2012/0051596 | A1* | 3/2012 | Darnell et al. | 382/103 |
| 2012/0113111 | A1* | 5/2012 | Shiki et al. | 345/419 |
| 2012/0139857 | A1* | 6/2012 | Terebkov et al. | 345/173 |
| 2012/0219196 | A1* | 8/2012 | Dekel | 382/128 |
| 2012/0249443 | A1* | 10/2012 | Anderson et al. | 345/173 |
| 2012/0309477 | A1* | 12/2012 | Mayles et al. | 463/3 |
| 2012/0329553 | A1* | 12/2012 | Gagner et al. | 463/29 |
| 2013/0165215 | A1* | 6/2013 | Arezina et al. | 463/25 |

FOREIGN PATENT DOCUMENTS

| | | | | |
|---|---|---|---|---|
| JP | 1269120 | A | 10/1989 | |
| JP | 5-31254 | | 2/1993 | |
| JP | 8083144 | A | 3/1996 | |
| JP | 8190453 | A | 7/1996 | |
| JP | 8241161 | A | 9/1996 | |
| JP | 10-277213 | | 10/1998 | A63F 7/02 |
| JP | 2000/010733 | A | 1/2000 | |
| WO | WO/97/30416 | | 8/1997 | |
| WO | WO/99/19855 | | 4/1999 | |
| WO | WO 01/05477 | A2 | 1/2001 | A63F 13/12 |
| WO | WO 01/05477 | A3 | 1/2001 | A63F 13/12 |
| WO | WO 01/33905 | A2 | 5/2001 | H04R 5/02 |
| WO | WO 01/33905 | A3 | 5/2001 | H04R 5/02 |
| WO | WO 02/24288 | A2 | 3/2002 | A63F 13/00 |
| WO | WO 02/24288 | A3 | 3/2002 | A63F 13/00 |
| WO | WO 02/40921 | A2 | 5/2002 | F21V 33/00 |
| WO | WO 02/40921 | A3 | 5/2002 | F21V 33/00 |
| WO | WO/2006/020305 | | 2/2006 | |
| WO | WO/2007/003928 | | 1/2007 | |
| WO | WO/2008/095132 | | 10/2008 | |
| WO | WO/2008/017077 | | 12/2008 | |

OTHER PUBLICATIONS

Hand Tracking, Finger Identification, and Chordic Manipulation on a Multi-Touch Surface, by Wayne Westerman; 363 pages (Spring 1999).

A Multi-Touch Three Dimensional Touch-Sensitive Tablet; CHI'85 Proceedings; pp. 21-25 (Apr. 1985).

The Sensor Frame Graphic Manipulator Final Report (Sensor Frame) 28 pages; (printed on Feb. 6, 2009).

The Design of a GUI Paradigm based on Tablets, Two-Hands, and Transparency; Gordon Kurtenbach, George Fitmaurice, Thomas Baudel, and Bill Buxton; 8 pages; (printed on Feb. 6, 2009).

SmartSkin: An Infrastructure for Freehand Manipulation on Interactive Surfaces, by Jun Rekimoto, Interaction Laboratory; 8 pages; (printed on Feb. 6, 2009).

Single-Handed Interaction Techniques for Multiple Pressure-Sensitive Strips by Gábor Blaskó, Steven Feiner; 4 pages; (printed on Feb. 6, 2009).

A Multi-finger Interface for Performance Animation of Deformable Drawings; Tomer Moscovich, Takeo Igarashi, Jun Rekimoto, Kentaro Fukuchi, John F. Hughes; 2 pages; (printed on Feb. 6, 2009).

Precise Selection Techniques for Multi-Touch Screens; Hrvoje Benko and Andrew D. Wilson and Patrick Baudisch; 10 pages; (printed on Feb. 6, 2009).

ThinSight: Versatile Multi-touch Sensing for Thin Form-factor Displays; Steve Hodges, Shahram Izadi, Alex Butler, Alban Rrustemi and Bill Buxton; 10 pages; (printed on Feb. 6, 2009).

Written Opinion corresponding to co-pending International Patent Application Serial No. PCT/US2007/021625, United States Patent Office, dated Sep. 15, 2008, 3 pages.

International Search Report corresponding to co-pending International Patent Application Serial No. PCT/US2007/021625, United States Patent Office, dated Sep. 15, 2008, 2 pages.

Web pages printed from http://multi-touchscreen.com/microsoft-surface-video-multi-touch-jeff-han-apple-bill-gates.html; (downloaded Aug. 24, 2009); 7 pages.

Web pages printed from http:///www.jazzmutant.com/lemur_overview.php; (downloaded Aug. 24, 2009); 2 pages.

Web pages printed from http://www.merl.com/projects/DiamondTouch/; (downloaded Aug. 24, 2009); 5 pages.

Web pages printed from http://www.merl.com/projects/?proj_area=Off+the+Desktop+Interaction+and+Dis; (Downloaded Aug. 24, 2009); 1 page.

Web pages printed from http://www.merl.com/projects/diamondspin/; (Downloaded Aug. 24, 2009); 2 pages.

Web pages printed from http://kioskmarketplace.com/article.php?id=12284&na=1; (Downloaded Aug. 25, 2009); 5 pages.

An Overview of Optical-Touch Technologies; Ian Maxwell; 5 pages; (dated Dec. 2007).

Freescale Semiconductor, E-field Keyboard Designs, Michael Steffen; 6 pages; (dated Sep. 2007).

Texas Instruments, PCB-Based Capacitive Touch Sensing with MSP430; Zack Albus; 25 pages; (dated Jun. 2007—Revised Oct. 2007).

Planet Analog, The art of capacitive touch sensing; Mark Lee, Cypress Semiconductor Corp.; 5 pages; (dated Mar. 1, 2006).

Weinert, Joe, Enterainment Vehicles, IGWB New '97 Games, pp. 11, 12 and 15-18 (Mar. 1997).

Written Opinion corresponding to co-pending International Patent Application Serial No. PCT/US2007/010048, United States Patent Office, dated Jun. 10, 2008, 3 pages.

International Search Report corresponding to co-pending International Patent Application No. PCT/US2007/010048, United States Patent Office, dated Jun. 10, 2008, 2 pages.

http://www.mrl.nyu.edu/~jhan/ftirsense/index.html; 2 pages, (downloaded Oct. 7, 2008).

http://ds.advancedmn.com/article.php?artid=3395;3 pages (downloaded Oct. 7, 2008).

http://us.gizmodo.com/gadgets/portable-media/apple-touchscreen-patent-documentation-154248.php; 11 pages (downloaded Oct. 7, 2008).

http://loop.worldofapple.com/archives/2006/02/08/multi-touch-interaction-video/; 19 pages, (downloaded Oct. 7, 2008).

http://www.pcmag.com/article2/0,1895,1918674,00.asp; 4 pages, (downloaded Oct. 7, 2008).

* cited by examiner

FIG. 5B
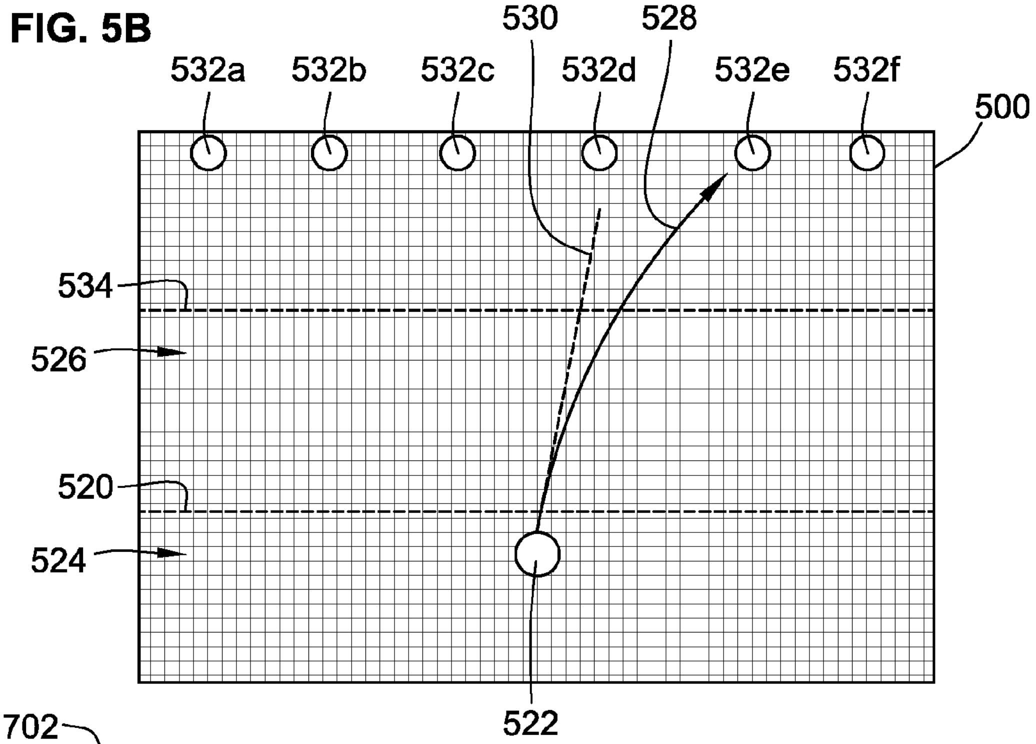
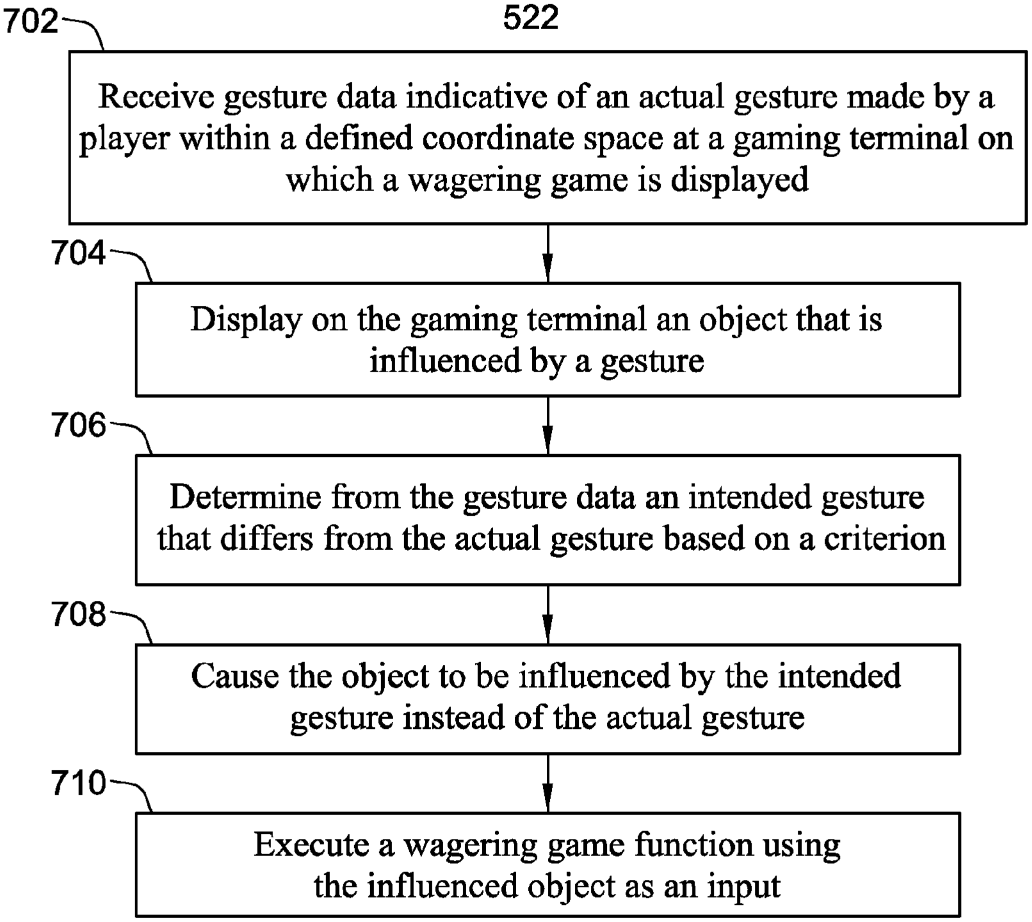
FIG. 7

GESTURE SENSING ENHANCEMENT SYSTEM FOR A WAGERING GAME

CROSS-REFERENCE To RELATED APPLICATION

This application claims the benefit of U.S. Provisional Patent Application Ser. No. 61/497,311, filed Jun. 15, 2011, entitled "Gesture Sensing Enhancement System for a Wagering Game" which is incorporated herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present invention relates generally to a gaming apparatus, and methods for playing wagering games, and more particularly, to a gaming system offering more accurate feedback based on gestures made by a player in game play.

BACKGROUND

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

Consequently, shrewd operators strive to employ the most entertaining and exciting machines available because such machines attract frequent play and, hence, increase profitability to the operator. In the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is that of a "secondary" or "bonus" game which may be played in conjunction with a "basic" game. The bonus game may comprise any type of game, either similar to or completely different from the basic game, and is entered upon the occurrence of a selected event or outcome of the basic game. Such a bonus game produces a significantly higher level of player excitement than the basic game because it provides a greater expectation of winning than the basic game.

Gaming machines have also utilized a variety of input devices for receiving input from a player, such as buttons and touch screen devices. However, these input devices are limited in that they can receive only one input at a time from the player. For example, if a player touches a single-point sensing device such as a single-point touch screen device at two distinct points simultaneously, only one coordinate is provided by the touch-screen driver corresponding to one of the distinct points only or to a single average point between the two points. The inability of the player to interact with the gaming machine and other players by providing multiple inputs simultaneously is a significant disadvantage to gaming machines heretofore. In order to address such issues, multi-point touch displays have been introduced recently. The use of such devices allows player gestures to be interpreted with a wider range of motions and therefore increase player immersion into the game. However, one issue with such interactive devices is an inaccurate modeling of the players' actions where gestures may be misinterpreted or one gesture may be construed as multiple gestures. Further, multi-point inputs may not accurately reflect a player's actions. The inaccurate reflection of a player gesture results in player frustration or player manipulation of the inaccurate device.

While these player appeal features provide some enhanced excitement relative to other known games, there is a continuing need to develop new features for gaming machines to satisfy the demands of players and operators. Therefore it would be desirable for a more accurate interactive interface for more accurate interpretation of player gestures.

SUMMARY

It has been observed by the inventors that a problem associated with interpreting gestures is that when a player makes a gesture, depending on the handedness of the player, there tends to be a trailing off of the gesture toward the end of the motion. As a result, the gesture the player actually intended to make can differ from the gesture actually sensed by the gesture-sensing hardware and software. For example, a right-handed player may tend to trail off to the right toward the end of a gesture, skewing the direction of the gesture toward the right. Aspects of the present disclosure are directed to ascertaining the intended trajectory and other characteristics of a gesture based on the actual gesture made by the player. In a wagering game context, it is particularly important to ensure that the intended gesture of the player is captured, for example, to ensure that an intended wager amount is inputted or to reassure the player that the gesture is accurately selecting a wagering game object.

A gaming terminal for playing a wagering game, the gaming terminal comprising a controller, a touch surface for actuation by a player gesture associated with an input to the wagering game, a sensor array underling the touch surface to sense the motion of the gesture, the sensor array coupled to the controller, wherein the controller converts the sensed motion to corresponding gesture data indicative of the gesture made by the player, and determines from at least a portion of the gesture data a trajectory of an intended gesture that differs from the gesture made by the player and a display coupled to the controller to display movement of an object image during the wagering game based on the trajectory of the intended gesture.

The controller can determine the trajectory by the tangent of a portion of a curved path of the gesture.

The controller can determine the trajectory based on a degree of curvature of an anticipated arc from the gesture.

The motion can include a pullback motion, and wherein the controller calculates the trajectory based on acceleration of the pullback motion.

The determination of the trajectory can include breaking the gesture into segments of sensors of the sensor array underlying the touch surface, measuring the acceleration of the gesture on each segment, and determining the trajectory based on the segment having the fastest measured acceleration.

The gaming terminal can further comprise a memory storing the gesture data as gesture values in a table having a plurality of trajectories each associated with different set of predetermined gesture values, wherein the controller selects one of the trajectories from the table based on a comparison of the gesture values with the predetermined gesture values.

The trajectory can be calculated based on the distance of the gesture on the touch surface and how much space an arc formed by the gesture occupies.

The touch surface can include a launch boundary defining a zone where the gesture is sensed.

The controller can determine a deceleration motion in the gesture, wherein the controller interprets the deceleration to cancel the input from the gesture.

The controller can sense any break in contact in the motion from the touch surface and terminates the input of the gesture.

The touch surface can include a defined area of the possible output in the array, and the gesture is calculated based on the sensors of the senor array in the area and all contact points of the gesture outside the area are disregarded to constrain the maximum angle of the gesture.

The touch surface can include a physical feature defining a point where the gesture releases the object image on the display.

The gaming machine can further comprise an audio output device coupled to the controller, the audio output device producing an audio output in response to the received gesture.

The gaming machine can further comprise a physical actuation device, the physical actuation output device producing a physical actuation in response to the received gesture.

The display can display indications of the resulting trajectory of the gesture relating to the object image.

A method of determining an intended gesture from an actual gesture made in a wagering game, comprising receiving gesture data indicative of an actual gesture made by a player within a defined coordinate space at a gaming terminal on which a wagering game is displayed, displaying on the gaming terminal an object that is influenced by a gesture, determining from at least a portion of the gesture data an intended gesture that differs from the actual gesture based on a criterion, causing the object to be influenced by the intended gesture instead of the actual gesture and responsive to the causing, executing a wagering game function using the influenced object as an input.

The criterion can include whether at least a portion of the actual gesture falls within a predefined area, the determining including if the portion of the actual gesture falls within the predefined area, ignoring the portion of the actual gesture in determining the intended gesture.

The criterion can include a trajectory of the actual gesture, the determining being carried out by calculating a tangent of a curved portion of an initial part of the gesture to determine the trajectory of the actual gesture and using the determined trajectory as the trajectory of the intended gesture.

The criterion can include whether the actual gesture is generally straight, the determining including determining a linear relationship between at least two points along the actual gesture responsive to the actual gesture being generally straight and using the linear relationship to determine the intended gesture.

The criterion can include an acceleration of at least a portion of the actual gesture, the determining including defining a plurality of segments along the actual gesture, calculating in each of the segments the acceleration of the actual gesture within the segment, determining in which of the segments the calculated acceleration is the highest, determining a trajectory of the actual gesture in the segment determined to have the highest calculated acceleration, and using the trajectory to determine the intended gesture.

The criterion can include a change in acceleration of at least a portion of the actual gesture relative to other portions of the actual gesture, the determining including defining a plurality of segments along the actual gesture, calculating in each of the segments the acceleration of the actual gesture within the segment, determining in which of the segments the acceleration has the highest change relative to the acceleration of the actual gesture in the other segments, determining a trajectory of the actual gesture in the segment determined to have the highest change in calculated acceleration, and using the trajectory to determine the intended gesture.

The criterion can include whether a characteristic of the actual gesture corresponds to value in a weighted table of values, the method further comprising selecting the value in the weighted table, and using the weighted table to determine an award for the wagering game based on a randomly determined winning outcome of the wagering game.

The characteristic is an angle relative to a horizontal line within the defined coordinate space.

The criterion can include whether a characteristic of the actual gesture corresponds to value in a weighted table of values, the method further comprising randomly selecting the weighted table or one of at least two weighted tables adjacent to the weighted table, wherein each of the weighted table and the at least two weighted tables has the same expected value but a different volatility, and using the randomly selected weighted table to determine an award for the wagering game based on a randomly determined winning outcome of the wagering game.

The method can further comprise sensing when the actual gesture has ended and coincidentally providing haptic feedback to the player who made the actual gesture to indicate that the actual gesture was received.

The haptic feedback is carried out by actuating a solenoid positioned under a substrate on which the actual gesture is made.

The method can further comprise displaying a trail of the actual gesture that persists after the actual gesture has completed, and displaying an indication of the intended gesture overlaying the trail.

The wagering game function can be accepting an amount of a wager.

The method can further comprise displaying a plurality of wager amounts on a display of the gaming terminal, displaying an animation in which the influenced object follows a path defined by the intended gesture until the influenced object corresponds to a selected one of the wager amounts, and using the selected wager amount as a wager to play the wagering game.

The wagering game function can include determining an award associated with the wagering game, the method further comprising displaying a plurality of further objects on a display of the gaming terminal, each of the further objects corresponding to an award to be awarded to the player responsive to a randomly selected outcome of the wagering game satisfying a criterion, displaying an animation in which the influenced object follows a path defined by the intended gesture until the influenced object corresponds to a selected one of the further objects, and awarding the player the award associated with the selected one of the further objects.

The award can include (a) eligibility to play a further round of the wagering game or a bonus game, (b) an amount of credits, or (c) an enhancement parameter associated with the wagering game.

A computer program product comprising a computer readable medium having an instruction set borne thereby, the instruction set being configured to cause, upon execution by a controller, the acts of receiving gesture data indicative of an actual gesture made by a player within a defined coordinate space at a gaming terminal on which a wagering game is displayed, displaying on the gaming terminal an object that is influenced by a gesture, determining from at least a portion of the gesture data an intended gesture that differs from the actual gesture based on a criterion, causing the object to be influenced by the intended gesture instead of the actual gesture and responsive to the causing, executing a wagering game function using the influenced object as an input.

The criterion can include whether at least a portion of the actual gesture falls within a predefined area, the determining including if the portion of the actual gesture falls within the predefined area, ignoring the portion of the actual gesture in determining the intended gesture.

The criterion can include a trajectory of the actual gesture, the determining being carried out by calculating a tangent of a curved portion of an initial part of the gesture to determine the trajectory of the actual gesture and using the determined trajectory as the trajectory of the intended gesture.

The criterion can include whether the actual gesture is generally straight, the determining including determining a linear relationship between at least two points along the actual gesture responsive to the actual gesture being generally straight and using the linear relationship to determine the intended gesture.

The criterion can include an acceleration of at least a portion of the actual gesture, the determining including defining a plurality of segments along the actual gesture, calculating in each of the segments the acceleration of the actual gesture within the segment, determining in which of the segments the calculated acceleration is the highest, determining a trajectory of the actual gesture in the segment determined to have the highest calculated acceleration, and using the trajectory to determine the intended gesture.

The criterion can include a change in acceleration of at least a portion of the actual gesture relative to other portions of the actual gesture, the determining including defining a plurality of segments along the actual gesture, calculating in each of the segments the acceleration of the actual gesture within the segment, determining in which of the segments the acceleration has the highest change relative to the acceleration of the actual gesture in the other segments, determining a trajectory of the actual gesture in the segment determined to have the highest change in calculated acceleration; and using the trajectory to determine the intended gesture.

The criterion can include whether a characteristic of the actual gesture corresponds to value in a weighted table of values, the instruction set being further configured to cause the acts of selecting the value in the weighted table, and using the weighted table to determine an award for the wagering game based on a randomly determined winning outcome of the wagering game.

The characteristic can be an angle relative to a horizontal line within the defined coordinate space.

The criterion can include whether a characteristic of the actual gesture corresponds to value in a weighted table of values, the instruction set being further configured to cause the acts of randomly selecting the weighted table or one of at least two weighted tables adjacent to the weighted table, wherein each of the weighted table and the at least two weighted tables has the same expected value but a different volatility, and using the randomly selected weighted table to determine an award for the wagering game based on a randomly determined winning outcome of the wagering game.

The instruction set can further be configured to cause the act of sensing when the actual gesture has ended and coincidentally providing haptic feedback to the player who made the actual gesture to indicate that the actual gesture was received.

The haptic feedback can be carried out by actuating a solenoid positioned under a substrate on which the actual gesture is made.

The instruction set can further be configured to cause the acts of displaying a trail of the actual gesture that persists after the actual gesture has completed, and displaying an indication of the intended gesture overlaying the trail.

The wagering game function can accept an amount of a wager.

The instruction set can further be configured to cause the acts of displaying a plurality of wager amounts on a display of the gaming terminal, displaying an animation in which the influenced object follows a path defined by the intended gesture until the influenced object corresponds to a selected one of the wager amounts, and using the selected wager amount as a wager to play the wagering game.

The wagering game function can include determining an award associated with the wagering game, the instruction set being further configured to cause the acts of displaying a plurality of further objects on a display of the gaming terminal, each of the further objects corresponding to an award to be awarded to the player responsive to a randomly selected outcome of the wagering game satisfying a criterion, displaying an animation in which the influenced object follows a path defined by the intended gesture until the influenced object corresponds to a selected one of the further objects, and awarding the player the award associated with the selected one of the further objects.

The award can include (a) eligibility to play a further round of the wagering game or a bonus game, (b) an amount of credits, or (c) an enhancement parameter associated with the wagering game.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 5B is a functional diagram of a coordinate space defined by a touch system illustrating an actual gesture made by a player and the intended gesture calculated by a controller;

FIG. 7 is a flowchart diagram of a method of determining an intended gesture from an actual gesture made in a wagering game.

Figure 1:
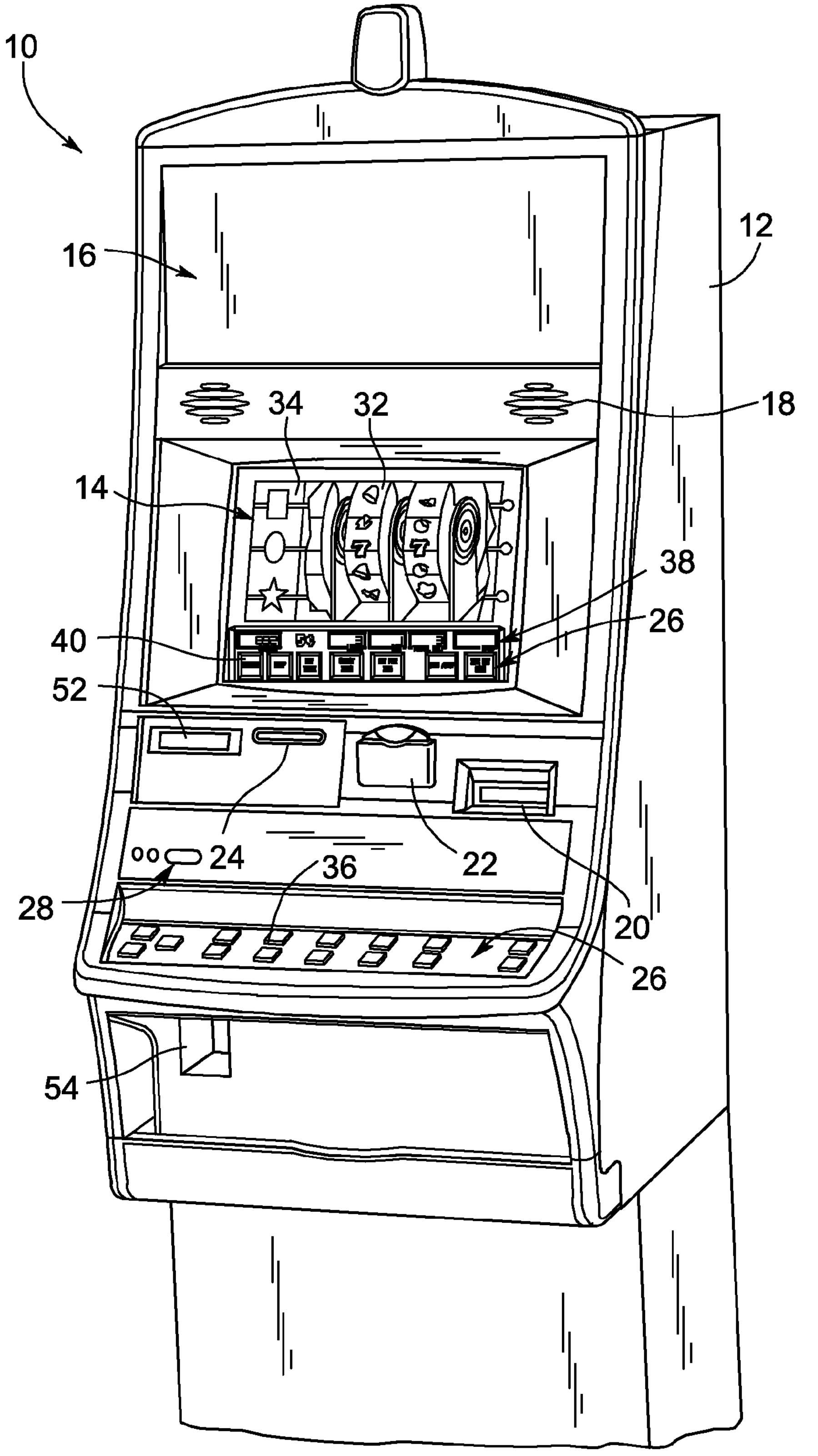
FIG. 1 (PRIOR ART)
FIG. 1 is a perspective view of a free-standing gaming terminal according to a disclosed example.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 11, 2007, titled "Handheld Device for Wagering Games," which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 10 illustrated in FIG. 1 comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1 includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1. The primary display area 14 includes, in relation to many aspects of wagering games conducted on the gaming terminal 10, one or more paylines 30 (see FIG. 3) extending along a portion of the primary display area. In the illustrated embodiment of FIG. 1, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen 38 mounted over the primary display area 14 and/or the secondary display area 16 and having one or more soft touch keys 40, as is also shown in FIG. 1. In still other aspects, the player-input devices 26 comprise technologies that do not rely upon physical contact between the player and the gaming terminal, such as speech-recognition technology, eye-tracking technology, etc. As will be explained below, the example player-input device(s) 26 in this example include gesture-sensing technology which allows sensing of player gestures as inputs to the gaming terminal 10. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354, published on Mar. 6, 2003, entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
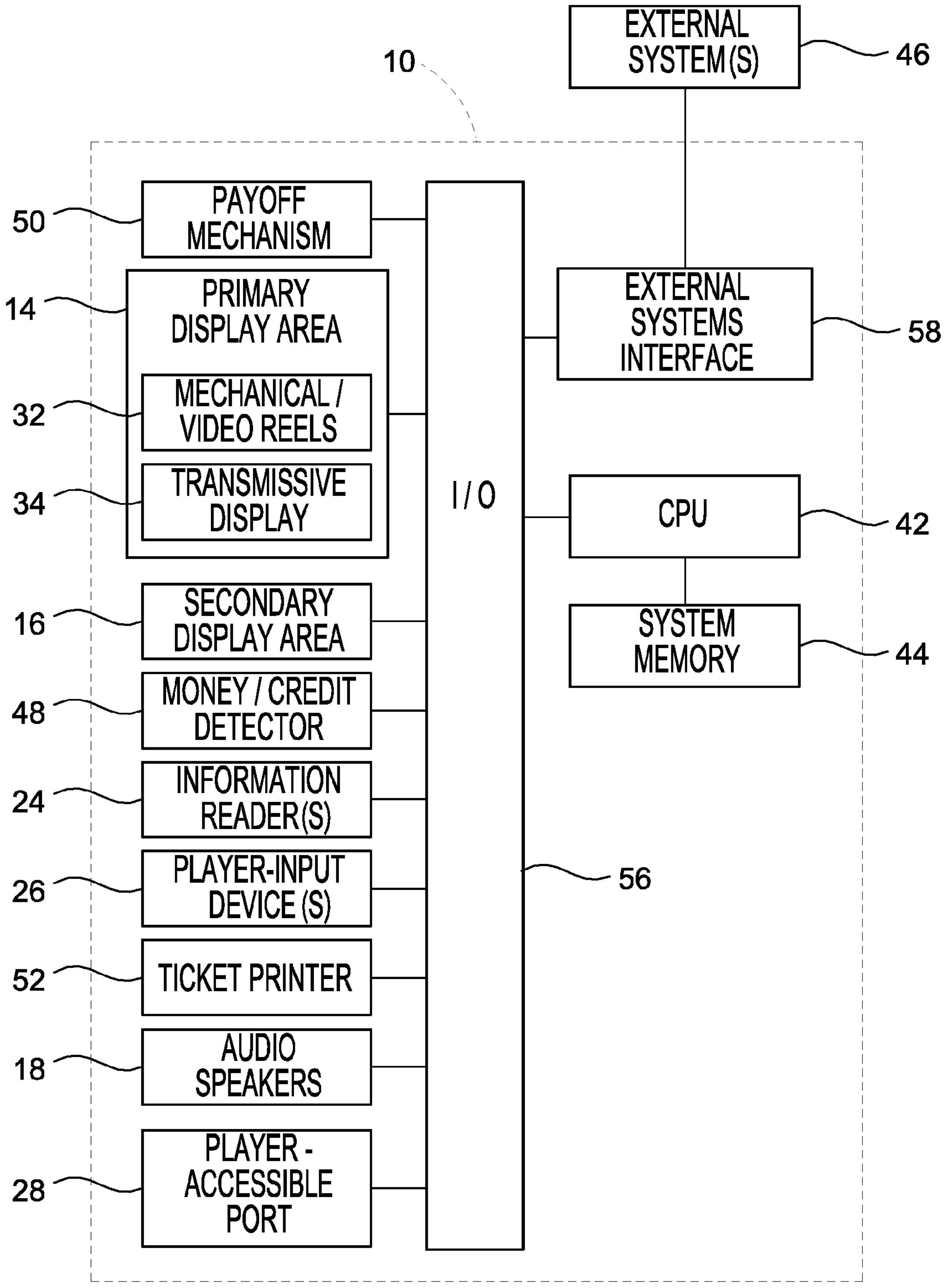
FIG. 2 (PRIOR ART)
FIG. 2 is a schematic view of a gaming system according to a disclosed example.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of non-transitory computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming terminal 10 or to an external system 46 associated with the gaming terminal can receive the data on the telephone line or conveyed through the communication path (e.g., via external systems interface 58) and output the data to a bus, which transmits the data to the system memory 44 associated with the controller 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device(s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
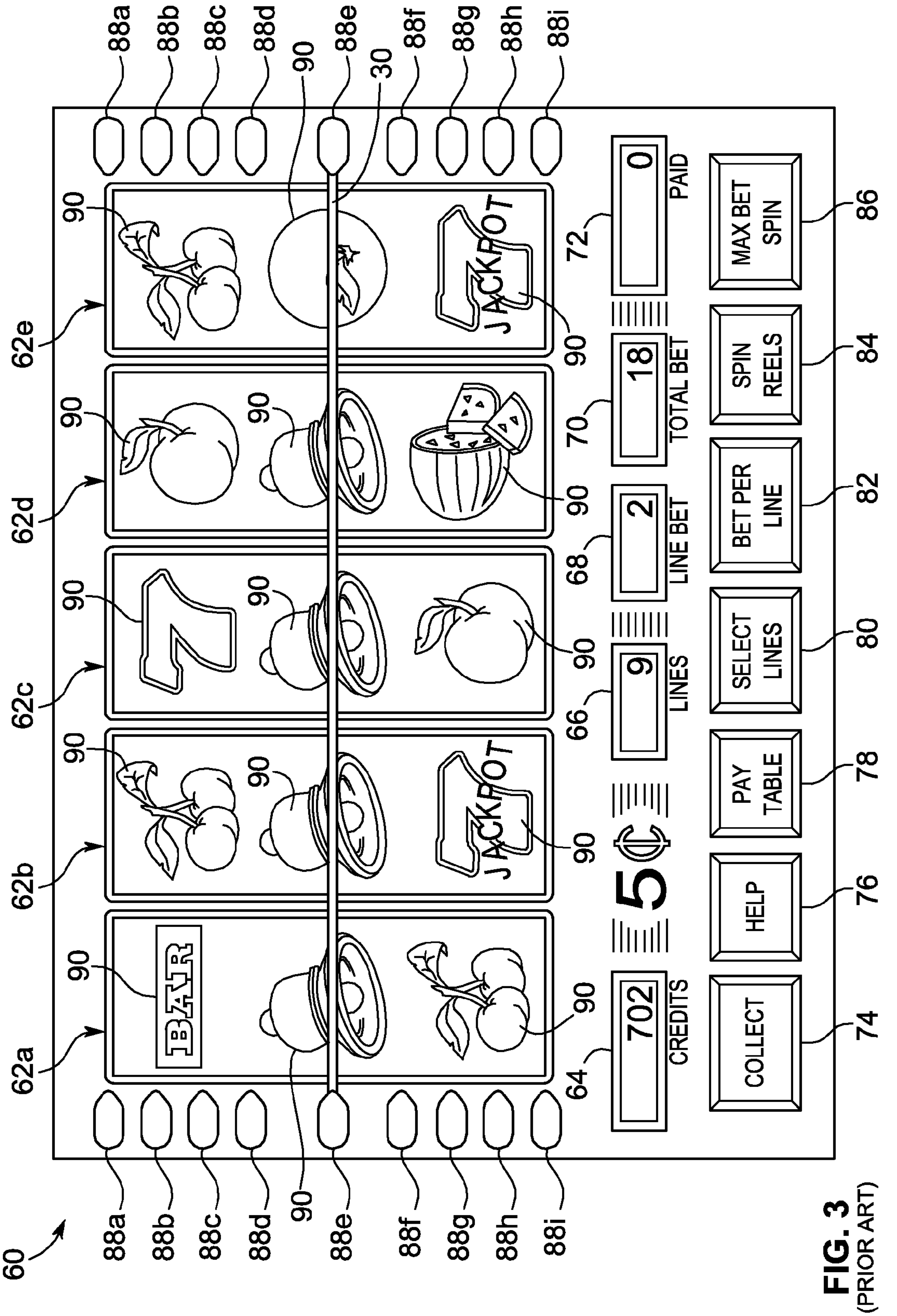
FIG. 3 (PRIOR ART)
FIG. 3 is an image of an exemplary basic-game screen of a wagering game displayed on a gaming terminal such as the gaming terminal in FIG. 1.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager, which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an example with nine paylines is shown, a wagering game with no paylines, a single payline, or any plurality of paylines will also work with the enhancements described below. Additionally, though an embodiment with five reels is shown in FIG. 3, different embodiments of the gaming terminal 10 comprise a greater or lesser number of reels in accordance with the present examples.

Figure 4:
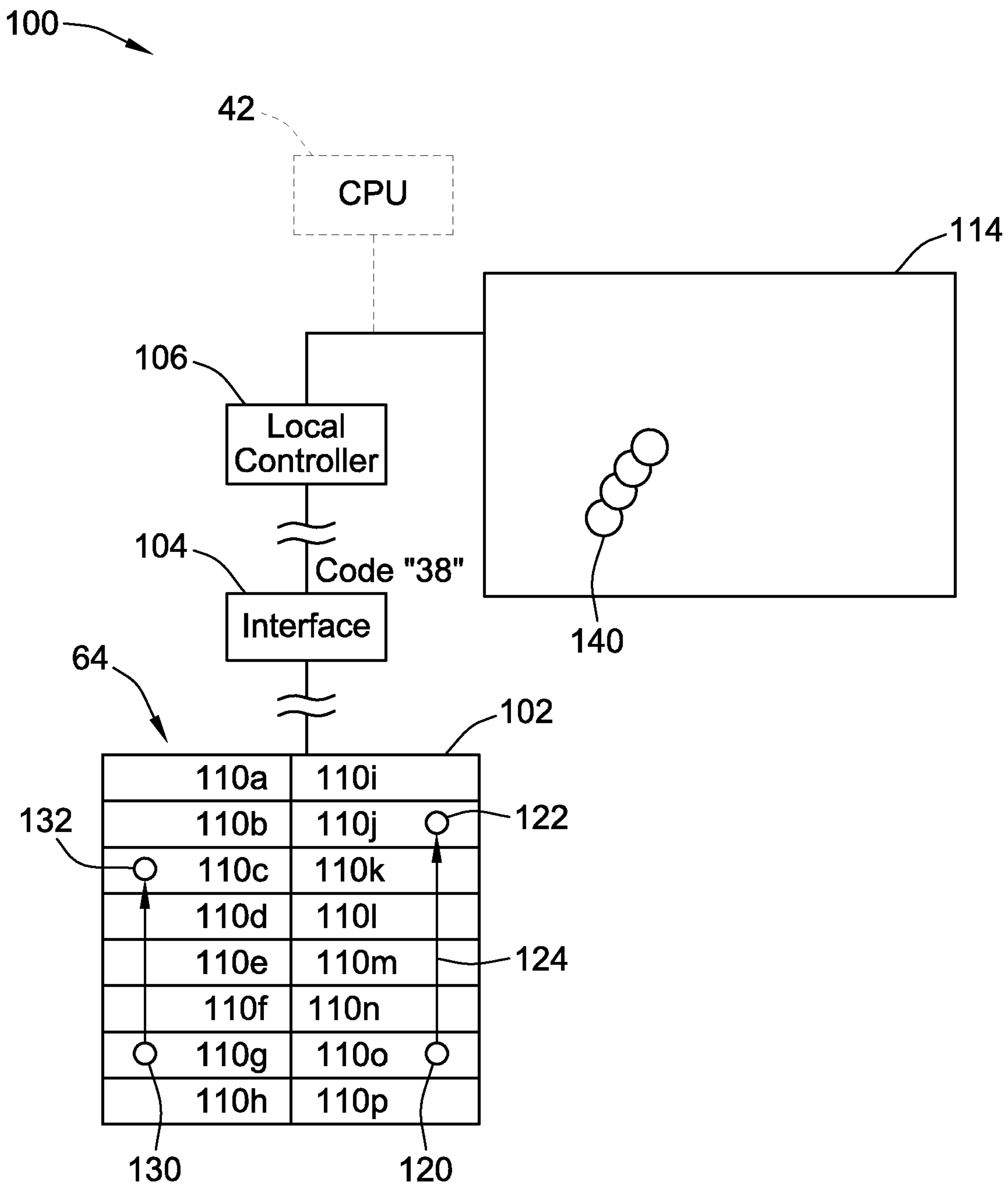
FIG. 4 is a functional diagram of a multi-touch system that includes an array of input sensors and a display of the gaming terminal displaying a graphic corresponding to a multi-touch gesture identified by the multi-touch input system.
Figure 5A:
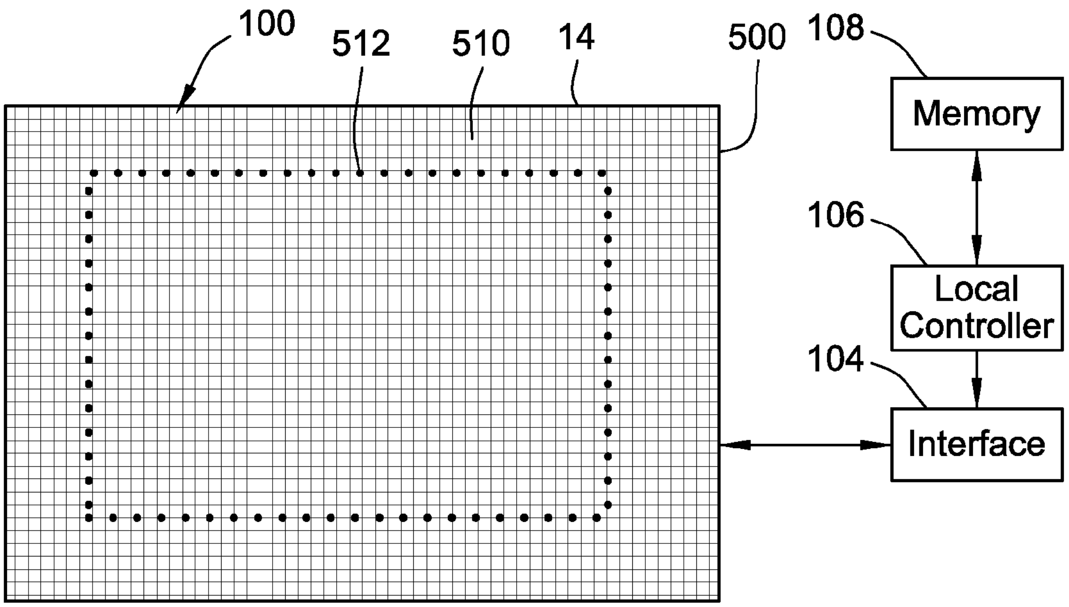
FIG. 5A is a functional diagram of another multi-touch sensing system integrated with the display area of a gaming terminal such as the gaming terminal in FIG. 1.

The gaming terminal 10 can include a multi-touch sensing system 100, such as the one shown in FIG. 4 or 5A. In FIG. 1, the example multi-touch sensing system 100 can be located in a button panel area of the gaming terminal 10 relative to the housing or cabinet 12 or may overlay or be integrated with the primary display 14. In an implementation, the multi-touch input system 100 includes a multi-touch sensing array 102, which can be coupled via an interface 104 to a local controller 106, which is coupled to a memory 108 (shown in FIG. 5A). In another implementation, the local controller 106 is not needed, and the touch sensing is carried out by a primary controller, such as the CPU 42 or a controller in the external system 46. The examples herein will be discussed with reference to a multi-touch sensing system 100 capable of sensing multiple touch points simultaneously; however, it is expressly contemplated that all of the implementations and aspects disclosed herein can also be implemented with a single-touch sensing system 100 that is capable of sensing a single touch point. Specific examples of touch interfaces and touch sensing systems will be described herein with reference to the drawings, but the present disclosure is not limited to the specific illustrations. Rather, the present disclosure contemplates other types of touch interfaces and sensing systems, such as capacitive touch systems, systems that use one or more cameras to capture a touch or a gesture, and conventional single-touch interfaces. Examples of techniques and systems for receiving player inputs via multi-touch input systems are more fully described in U.S. Patent Application No. 2009/032569, which is incorporated herein by reference.

As used herein, a "touch" or "touch input" does not necessarily mean that the player's finger or body part actually must physically contact or touch the multi-touch sensing device array 102 or other multi-touch sensing device. As is known via techniques such as via capacitive sensing techniques and other electromagnetic or optical techniques, the player's body need not actually physically touch or contact the multi-touch sensing device, but rather need only be placed in sufficient proximity to the multi-touch sensing device so as to be interpreted as a touch input.

The local controller 106 can be coupled to the controller 42, either directly or via the I/O circuit 56. The local controller 106 receives information outputted from the multi-touch sensing array 102 via the interface 104, where the outputted information is indicative of a multi-point gesture made relative to the multi-touch sensing array 102. In a specific aspect, the array 102 of multi-touch sensing system 100 includes input sensors 110 (shown in FIG. 4) for detecting simultaneously multiple contact points representative of one or more possible multi-point gestures made relative to the array of input sensors 102, which is described in more detail below, and a printed circuit board that supports the array of input sensors 102. Each input sensor 110*a,b,c,d,e,f,g,h,i,j,k,l,m,n,o,p* in the array 102 detects one touch input at a time made by the player of the wagering game. As an array 102, however, multiple touches on different input sensors are detected simultaneously by the local controller 106, as will be explained more fully below. This configuration is a specific implementation of a relatively simple touch system where fine gestures are not needed to be sensed. The configuration shown in FIG. 4 is intended for "gross" gestures (as opposed to fine gestures), such as launching a projectile, where fine precision is not necessarily needed. The optional local controller 106 relieves the main controller, such as the CPU 42, from the processing burden of interpreting and sensing the gestures made relative to the multi-touch sensing array 102.

Although a specific multi-touch sensing system 100 is shown in FIG. 4, the present disclosure expressly contemplates other multi-touch sensing systems, including, for example, a multi-touch sensing system that includes a digital video camera as a multi-touch sensing device or a capacitive multi-touch device, such as the multi-touch display available from 3M™. Any implementation discussed herein can use any of these multi-touch sensing systems or any conventional single-touch sensing system capable of sensing a gesture made relative to a substrate of the sensing system. Although many of the implementations discussed herein use a multi-touch sensing system, these implementations can alternatively use a single-touch sensing system. Both single-touch and multi-touch sensing systems may be referred to herein generally as a gesture sensing system.

As used herein, a multi-point gesture refers to a gesture that originates by touching simultaneously two or more points relative to the multi-touch sensing system 100. By "relative to" it is meant that the body need not actually physically touch any part of the multi-touch sensing array 102, but must be brought sufficiently near the array 102 so that a touch input can be detected. Such multi-point gestures can be bimanual (i.e., require use of both hands to create a "chording" effect) or multi-digit (i.e., require use of two or more fingers as in rotation of a dial). Bimanual gestures may be made by the hands of a single player, or by different hands of different players, such as in a multi-player wagering game. By "simultaneously" it is meant that at some point in time, more than one point is touched. In other words, it is not necessary to touch two different points at the precise same moment in time. Rather, one point can be touched first, followed by a second point, so long as the first point remains touched as the second point is touched. In that sense, the first and second points are touched simultaneously. If contact must be removed from the first point before the second touch is capable of being sensed, then such a touch scheme would be deemed to be a single-touch scheme. For example, each individual input sensor 100*a,b,c,d,e,f,g,h,i,j,k,l,m,n,o,p* in the array of input sensors 102 can, for example, detect only one touch input at a time, but the entire array 102 can detect multiple touches simultaneously.

An actual gesture is one physically made with one or both hands by a player of the wagering game in a defined coordinate space that is configured for sensing or detecting the actual gesture. A gesture sensing system captures the actual gesture and converts it into corresponding gesture data indicative of the actual gesture. The coordinate space can be a two- or three-dimensional space defined by coordinates in each dimension. The gesture data can include, for example, coordinates corresponding to a path taken by the actual gesture within the coordinate space, along with other optional characteristics such as, for example, any combination of direction, velocity, acceleration, and pressure.

An intended gesture, by contrast, is a gesture that is determined or calculated by an electronic controller under control of software or firmware on one or more tangible non-transitory medium/media and corresponds to an estimation or approximation of what the player actually intended to gesture, which can be different from the player's actual single- or multi-touch gesture. In particular but not exclusively, the intended gesture is configured to account for the unconscious and unintended trail-off that occurs depending on the player's handedness (either right-handedness or left-handedness), which can skew the path of the actual gesture especially toward the end of the gesture. When the gesture is used to launch a projectile, such as a coin or a ball, for example, at one or more targets, the trail-off effect could otherwise cause the projectile to hit a target that the player did not intend to aim for using existing gesture-sensing techniques. Aspects disclosed herein avoid this problem by estimating or approximating what the player actually intended to gesture based on, for example, a criterion or a characteristic of the actual gesture. As a result, the gesture accuracy is enhanced, increasing the player's satisfaction in the wagering game and imbuing in the player a sense of confidence that the wagering game is capturing the player's intended actions.

Turning now to FIG. 4, an example of the multi-touch sensing system 100 is described here in more detail. The multi-touch sensing device array 102 includes the input sensors 110. Each of the input sensors 110*a,b,c,d,e,f,g,h,i,j,k,l,m,n,o,p* (it should be noted that only 16 sensors are shown for ease of illustration and discussion; the present disclosure contemplates using many more sensors, such as dozens or hundreds or thousands of distinct sensors, depending upon the desired resolution of the gesture sensing system) is capable of detecting at least one touch input made relative to the sensor 110*a,b,c,d,e,f,g,h,i,j,k,l,m,n,o,p*. In this example, the array of input sensors 102 includes a plurality of conductive pads mounted on a printed circuit board (PCB), which supports the necessary electrical connections to connect the outputs of each input sensor 110 to the interface 104 (shown in FIG. 2). Each of the conductive pads detect the touch input by capacitive sensing, though in other aspects, other suitable sensing techniques can be employed. Alternative sensing techniques are well known (e.g., photoelectric, infrared, optical, piezoelectric, frustrated total internal reflection, laser, electromagnetic, electrostatic, inductive, and the like), and will not be described in detail here. Some techniques require a physical contact with the array of input sensors 102 (either by the player's body or by a device held by the player), and others work by proximity detection, producing an output indicative of a touch input when an object or body part is brought in sufficient proximity to the sensor. As shown in FIG. 4, the input sensors 110 are arranged in a rectangular array. In the illustrated example, the array includes 16 input sensors 110 in an arrangement of two columns by eight rows (again, only 16 sensors are shown for ease of illustration, but in other implementations, more sensors can be used depending upon the desired gesture-sensing sensitivity and resolution). It is contemplated that the array of input sensors 110 can include other shapes or arrangements, and may include more or fewer numbers or rows and/or columns. For example, to detect circular gestures, it may be desired to arrange the array input sensors 110 in a circular pattern. As used herein, "array" refers to any arrangement of the input sensors. Here, it is convenient to refer to an array as a grid comprising rows and columns, but any other arrangement is also contemplated. The input sensors 110 in other aspects can be arranged as a grid of touchpad cells, each capable of detecting one contact point.

The size and resolution of the multi-touch sensing system 100 can be optimized for detecting multiple touch inputs, specifically associated with gestures made by a player in a wagering game with multiple fingers. For example, the multi-touch sensing system 100 is about 2 inches wide by about 3 inches long, and may have a fairly low resolution (e.g., a total of 16 individual input sensors 110). In other embodiments, the multi-touch sensing system 100 is divided in half (left to right) and implemented as two single-touch devices. Other methods of sensing multiple contacts with a multi-touch sensing device are described in PCT Application No. PCT/US2007/021625 [247079-512WOPT], filed on Oct. 10, 2007, assigned to WMS Gaming Inc., entitled "Multi-Player, Multi-Touch Table for Use in Wagering Game Systems."

Preferably, the components of the multi-touch input system 100 are constructed so that they form a single unit. For example, the multi-touch sensing array 102, the local controller 106, the memory 108, and the interface 104 can be mounted on a common substrate, such as a PCB to form a compact device that can be easily installed as a component of the gaming terminal 10. In the illustrated example of FIG. 4, the total number of electrodes (for example, 16) is significantly lower than for a typical LCD display, resulting in simpler electronics and lower cost. Direct wiring of each input sensor 110 to the interface 104 can be achieved instead of mounting sensor circuits to the array of input sensors 102. An advantage of this multi-touch input system 100 is that is simple, easy to fabricate, and can be constructed as a separate module for assembly into a gaming terminal such as the gaming terminal 10. Another advantage is that certain "gross" (as opposed to fine) gestures do not necessarily require a high resolution touch sensor, and the multi-touch input system 100 herein provides a simple, fast human-machine interface for detecting gestures.

FIG. 4 further illustrates the multi-touch sensing system 100 sensing player contacts representing the path of two fingertips associated with a multi-touch gesture made in relation to a wagering game. In this example, the multi-touch gesture may be indicative of motions such as depositing a coin, moving, tossing, launching, or shuffling an object. In other words, the player makes a gesture relative to the multi-touch sensing device 164 that is similar to or approximates how the player would deposit a token or a coin for an example or how the player launches an object at one or more targets for another example. The contact point designated as a circle 120, 130 represent starting position of a first and a second fingertip, respectively, of the player. The contact points designated as a circle 122, 132 represent ending positions of the first and second fingertips, respectively. A path 124 illustrates the movement of the first fingertip between the starting positions 120 and the ending position 122. The lengths and time period associated with the path 124 determine the speed of a simulated object propelled by a player gesture. For example, the local controller 106 determines the time when the initial and final contact points 120 and 122 were made and the "distance" of the gesture, spanning the input sensors 110*j*-110*o*.

The multi-touch sensing system 100 optionally includes a thin, plastic overlay or substrate for protection and appearance. The overlay may include information, such as instructions for using the multi-touch sensing system 100, or a graphic, such as a coin, a token, a dart, a ball or other graphics related to a wagering game. The multi-touch sensing system 100 can be located on a panel of the gaming terminal 10 with other input devices 26, as shown in FIG. 1 or may be located in a different location on the gaming terminal 10. In this example, the multi-touch sensing system 100 is located in the gaming terminal 10 relative to the housing 12 or cabinet thereof and is positioned in a non-overlapping relationship with the primary display area 14 or the secondary display area 16.

Another type of multi-touch sensing system 100 that is suitable for interpreting gestures is a multi-touch display such as the 3M™ multi-touch display, which is both a display suitable for the primary display area 14 and for sensing gestures. FIG. 5A shows an expanded multi-touch touch sensor 500 represented as an array relative to the display area 14 as part of the multi-touch sensing system 100. Gestures made by a player anywhere within the coordinate space defined by the display area 14 are therefore sensed rapidly and accurately. In this example, the array 500 has a resolution of 40×64, which is diagrammatically represented as 40×64 sensors 510 (for ease of illustration, only a small fraction of the total number of sensing points is shown in the drawings) that cover substantially the entire area of the display area 14 and therefore a wide range of gestures may be sensed. It should be understood that when the multi-touch sensing system 100 utilizes surface capacitive touch technology, the touch resolution is governed by the range of voltages sensed and the resolution of the analog-to-digital converter that converts the sensed voltages into discrete quantized spatial touch-point values. For ease of discussion, the resolution of any multi-touch sensing system disclosed herein will be represented as an array of sensing points, subject to the resolution of the sensing hardware, such as an A/D converter, number of discrete touch sensors, or a camera, for example.

As described above with respect to FIG. 2, the multi-touch sensing device array 102 is one component of a multi-point input system 100. In one example in FIG. 4, the multi-touch sensing device array 102 is connected to circuitry associated with the interface 104. The interface 104 receives the individual output data from the respective input sensors of the array of input sensors 110 and converts them into gesture data indicative of characteristics related to the multi-point gesture. Preferably, the gesture data is indicative of at least two characteristics related to the multi-point gesture. Such characteristics include a location of a contact point relative to the multi-point sensing device array 102, a gesture direction, a gesture duration or length (as indicated by the path 124), or a gesture speed, or any combination thereof.

Optionally, the local controller 106 can determine whether the gesture data received from the multi-point sensing system 100 corresponds to any of a plurality of gesture classification codes stored in the memory 108. If a valid gesture is determined (i.e., the gesture data corresponds to one of the plurality of gesture classification codes), the local controller 106 communicates the classification code to the CPU 42. This communication may occur over a USB connection, for example, though any other suitable wired or wireless connection techniques are contemplated. If no valid gesture is determined, the local controller 106 may communicate an error code to the CPU 42, so that the game may instruct the player to try again, or some other appropriate response. Another option is for the local controller to simply ignore the attempted input, thereby relieving the CPU 42 to perform other tasks relating to the wagering game. An advantage of having a separate local controller 106 filter only valid gestures is that the CPU 42 is not burdened by having to check every gesture made relative to the multi-touch sensing system 100 to determine whether it recognizes the gesture. In some implementations, such burdening of the controller 42 can prevent it from processing other tasks and functions related to the wagering game. In this sense, the local controller 106 acts as a "filter," allowing only valid gestures to be passed to the controller 42, such that when the CPU receives a classification code from the local controller 106, the controller 42 can analyze that classification code to determine what function related to the wagering game to perform. Thus, rather than providing the raw coordinate data of the gesture, e.g., the X and Y locations of each touch input, continuously to the CPU 42, the local controller 106 takes the burden of interpreting the gesture data outputted by array of input sensors 110 via the interface 104 and classifies the gesture data according to a predetermined number of valid gestures. However, in other implementations, this filtering option can be eliminated.

The local controller 106 can include a predetermined classification system stored in the memory 108, where the predetermined classification system includes a plurality of gesture classification codes, each code representing a distinct combination of characteristics relating to the multi-point gesture. The predetermined classification system can recognize a finite number of valid gestures. Further, the local controller 106 interprets gestures to more accurately match the gesture sensed with stored classification codes. Alternately, any function disclosed herein that is carried out by the local controller 106 can be carried out by the CPU 42 and/or the external system(s) 46.

Alternately, instead of organizing the rows and columns of the table with different gesture characteristics, the local controller 106 in other aspects can determine a characteristic at a time relating to the multi-point gesture. For example, the local controller 106 can determine a speed characteristic relating to the multi-point gesture, and if the speed corresponds to a predetermined classification code for the speed characteristic, the local controller 106 communicates that code to the controller 42. In addition, the local controller 106 determines a direction characteristic relating to the multi-point gesture, and if the direction corresponds to a predetermined classification code for the direction characteristic, the local controller 106 communicates that code to the controller 42. In other words, there may be two separate tables of classification codes, one for speed and the other for direction, and these individual codes are communicated by the local controller 106 to the controller 42. While this is more cumbersome and less desirable, it is contemplated as an alternative way of detecting gestures while still achieving an objective of transferring the burden of detecting gestures away from the CPU 42 to the local controller 106. In other implementations, the CPU 42 can receive the gesture data and interpret the gesture data to determine an intended path of an actual gesture.

The controller 106 can access the memory 108 for determining characteristics corresponding to any particular predetermined gesture classification codes and their respective inputs to a wagering game. The system memory 44 can also include a similar table storing the predetermined gesture classification codes. In the exemplary table described above, the predetermined classification system includes five levels of a speed characteristic relating to the multi-point gesture and five levels of a direction characteristic relating to the multi-point gesture, for a total of 25 different gesture-related codes corresponding to different combinations speed and direction. It is contemplated more or fewer levels of speed or direction or other characteristics (such as pressure and/or acceleration) can be incorporated into the classification system.

To generate the predetermined classification codes, algorithms for interpreting the raw gesture data from the multi-touch sensing system 100 can be developed iteratively. Various gestures are made relative to the multi-touch sensing system 100 to develop a range of speeds to correspond to a particular classification code. The algorithms can also be changed depending the gesture being simulated. The raw gesture data can include coordinates within the coordinate space corresponding to the touched points, which together form a path or trajectory of the actual gesture.

Thus, instead of having an infinite number of possible gestures that may occur, only a finite number of valid gestures are available. This simplifies and reduces the information that is supplied to the controller 106, yet creates in the player the perception that there are an infinite number of possible gestures. Thus, according to a method, the player simulates a gesture relating to a wagering game, i.e., a wager input by depositing a coin, by contacting the multi-point sensing device array 102 at least two contact points simultaneously (e.g., points 120 and 150 in FIG. 4). The array of input sensors 110 in FIG. 2 or the array of input sensors 510 in FIG. 5 detects the contact points, and the local controller 106 analyzes data outputted by the sensors 110 or 510 via the interface 104 to determine the relevant characteristics of the contacts (which together form the multi-point gesture), such as the location of a contact point, gesture duration/length, gesture spin direction, gesture pressure, or gesture speed or acceleration. Based on this information, in this example, the local controller 106 determines whether to assign a classification code to the sensed gesture, and, if so, communicates the classification code corresponding to the sensed gesture to the controller 42. The controller 42 receives the classification code and accesses a table of functions to execute depending upon the classification code. In an aspect, the system memory 44 or other suitable memory includes a plurality of predefined functions, each associated with different graphical animations of an object relating to the wagering game. Each animation depicts the object appearing to move in a manner that corresponds to the associated characteristics corresponding to the classification code. Alternately, the local controller 106 or the CPU 42 can receive raw gesture data that includes coordinates of the actual gesture.

For example, for a throwing coins gesture, if the classification code indicates a slow speed and a straight spin direction, a first animation of the coin 140 in the display area 14 (shown in FIG. 4) includes a sequence of images that when animated cause the coin 140 to appear to move at a relatively slow speed in a straight direction on the primary display area 14 or on the secondary display area 16 based on the gesture. Similarly, if another classification code indicates a fast speed and a hard right spin direction, a second animation of the coin 140 includes a sequence of images that when animated cause the coin to appear to move at a relatively fast speed and spin in a hard-right direction. Alternately, instead of having predetermined sequences of animation data for each corresponding gesture classification code, a physics engine is employed for animating the coin 140 in real time in accordance with the characteristics parameters (in this example, speed and direction) passed to the physics engine.

The coin 140 is made to appear to move in accordance on the display area 14 with the gesture characteristics indicated by the corresponding gesture classification code as shown in FIG. 4. In preferred aspects, the randomly selected outcome of the wagering game is predetermined, so the gesture does not have an effect on the outcome of the wagering game.

However, the player may perceive the gesture as having some influence on the outcome, and thus the gesture may have the effect of imparting a sense of skill or control over the wagering game. To cement this impression, the speed and direction of the virtual coin 140 corresponds to the speed and direction of the gesture by the player as will be explained below. In this way, the player can make the coin 140 roll faster by making a faster gesture.

The object depicted on the display area 14 or the secondary display area 16 in response to the communication of a classification code from the local controller 106 to the controller 42 is related to the wagering game. In other aspects, the object (such as the coin 140) is involved in the depiction of a randomly selected outcome of the wagering game. For example, the values on the faces of the coin 140 can indicate or reflect a randomly selected outcome.

An advantage of the classification system described above includes the handling of "outlier" contact points. For example, certain types of gestures, such as a downward gesture, a gesture that skips across the surface of the multi-touch sensing array 102 or the expanded array 500, etc., may cause a calculated algorithm to produce data that would generate gestures in odd directions, such as gestures with high velocities or zero velocity. The classification system described herein would only allow valid gesture-related outputs to be provided to the controller 42. In some examples, a "bad" input may be classified as a benign gesture or may be rejected completely. Under these conditions, the local controller 106 may assign a classification code that relates to a maximum, a minimum, or another predefined code to avoid communicating information based on a "bad" or invalid gesture.

The local controller 106 allows more precise interpretation of gestures from the multi-touch system 100. Initial parameters may be stored in the memory 108 that define valid areas of the multi-touch sensing array 102 or 500. For example, in FIG. 5B, a launch zone or boundary 520 may be defined relative to the multi-touch sensor 500 in the display area 14. A gesture starting point 522 is defined on one side 524 of the launch boundary 520. Any gesture that originates on the other side 526 of the launch boundary will be ignored by the local controller 106. Thus, gestures that originate on the specified side 524 of the launch boundary 520 such as the gesture starting point 522 and cross the launch boundary 520 will be interpreted by the local controller 106. Optionally, a terminating zone or boundary 534 can also be defined, beyond which any gesture input will be ignored such that only the gesture portion falling within the area defined by the lines or boundaries 524, 534 will be interpreted for ascertaining the intended gesture by the player. The actual gesture 528 made by the player is shown in FIG. 5B as a line for ease of illustration, although the trajectory or path of the actual gesture 528 need not be displayed to the player. The controller 42, 106 can use the actual gesture 528 to determine a function related to the wagering game. Alternately, the controller 42 or 106 can determine an intended trajectory or path 530 of the gesture for purposes of determining the function related to the wagering game. For example, the gesture starting points 522 can be represented as a virtual coin displayed in the display area 14, and the player uses a finger to drag the virtual coin and launch it beyond the launch boundary 520 at one of several targets 532*a,b,c,d,e,f* displayed opposite the launch boundary 520. In an implementation, the actual gesture 528 by the player after the gesture 528 crosses the launch boundary 520 is used to determine a trajectory or path of the gesture 528. In this example, the actual gesture 528 can cause the virtual coin to appear to hit or interact with the target 532*f*. The targets 532*a,b,c,d,e,f* can represent different wager amounts, different awards for the primary game or a bonus game, or eligibility to play a bonus game. In another implementation, the controller 42 or 106 determines the intended trajectory 530 of the actual gesture 528, which causes the virtual coin to appear to hit target 532*d* instead. By discounting the portion of the gesture 528 before crossing the launch boundary 520, a more accurate gesture sensing scheme is achieved. When combined with any of the methods or implementations herein for determining the intended gesture 530, the gesture-sensing scheme can achieve even greater accuracy by identifying the target that the player intended to hit, even though the actual gesture would have hit a different target.

Figure 6A:
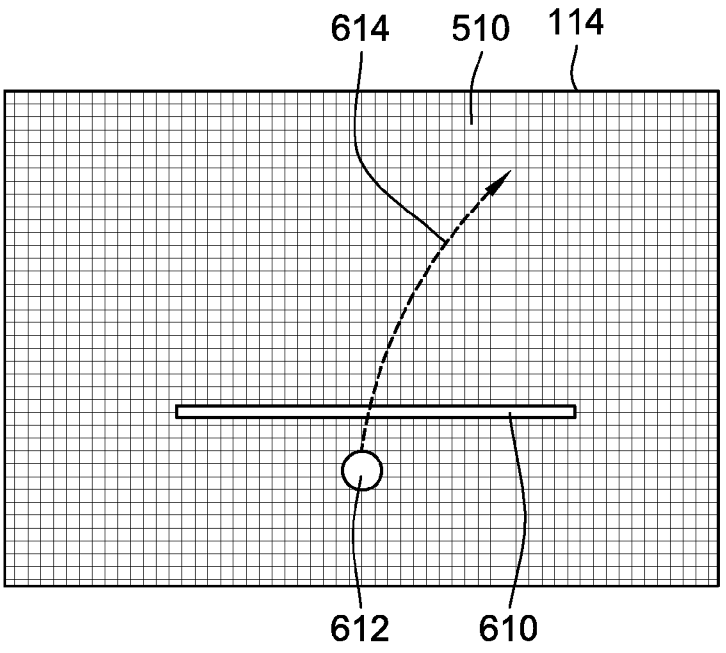
FIG. 6A is a display image of a multi-touch interface that determines an input based on a player's gesture motion from a defined starting point.

In cases where a gesture involves moving an object such as depositing a coin or throwing a projectile, a zone of input can be defined for purposes of calculating the trajectory of the object affected by the gesture. For example, if the player is gesturing to pitch a coin, a zone of input may be defined as the area between the launch boundary 520 (defined as a line, for example, extending across the multi-touch sensor 500) in FIG. 5B and an ending line or boundary 534. Thus, the trajectory will be determined only for gestures that are within the zone of input area 536 on the multi-touch sensor 500. Such a zone of input can have different dimensions and shapes other than the rectangular shape of the input area 536 in FIG. 5B, such as a cone or trapezoidal shape. FIG. 6A shows the array 500 in FIG. 5A with a start line 610 which is shown to a player in the display area 14. In the example, shown in FIG. 6A, a coin image 612 is displayed to the player who makes a gesture as represented by the line 614 and releases the coin image 612 over the start line 610. FIG. 5A illustrates a rectangular-shaped zone of input 512 within which gestures are interpreted and any portion of a gesture that falls outside the zone of input 512 is ignored. The zone of input 512 can be displayed to the player or invisible to the player.

The controller 106 can be programmed to determine the trajectory of the object propelled by the gesture motion in a number of ways to insure accurate response to an intended gesture. A gesture such as throwing a coin can involve a pullback and release gesture to match a predetermined action in the stored tables in the memory 108. The acceleration of the pullback and release gesture can be sensed and calculated to determine the trajectory of the intended gesture on the object.

Figure 6B:
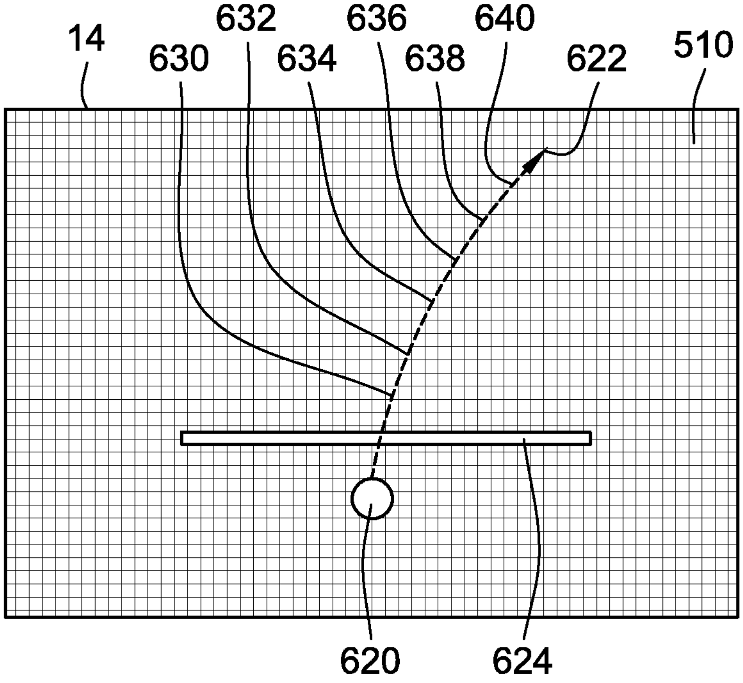
FIG. 6B is a display image of a multi-touch interface that determines an input based on player's gesture motion from segmenting the gesture path.

A gesture can be broken up into multiple gesture segments to determine the intended trajectory. FIG. 6B shows the multi-touch array 500 in FIG. 5A with an object 620 displayed on the display area 14. The player makes an actual gesture that causes the object 620 to move according to a trajectory represented by the dashed line 622. The input from the actual gesture is determined after a launch zone or boundary represented by a start line 624. The trajectory of the gesture path 622 is indicative of the player motion over the start line 624. In this example, the gesture path 622 is broken down into different gesture segments 630, 632, 634, 636, 638 and 640. The acceleration of the gesture in each segment is determined based on speed characteristics versus time of the gesture segment at the beginning and end of each gesture segment. The gesture segment 630, 632, 634, 636, 638 and 640 that has the fastest acceleration is selected to be the estimate of the intended trajectory of the object 620 that is propelled, launched, or moved by the gesture. Alternatively, the gesture segment that experiences the highest change in acceleration relative to the accelerations calculated for the other gesture segments can be selected to determine the intended trajectory of the actual gesture. A throwing gesture tends to have relatively low acceleration initially, followed by rapid acceleration, and then a deceleration as the gesture trails-off before the player releases the projectile. By determining the areas of highest acceleration or highest change in acceleration, the intended trajectory can be determined from the speed and direction characteristics of the gesture in the corresponding gesture segment. Alternatively, a random segment of the gesture segments 630, 632, 634, 636, 638 and 640 can be selected for calculating the trajectory of the projectile object 620.

Another implementation to determine the intended trajectory of the gesture is to compute the tangent of the early portion of the curved path of the gesture based on data from sensors 510 in the early portion of the path from the starting point. After filtering to isolate these points, the tangent is calculated by the controller 106 to determine the intended trajectory. The intended trajectory can also be determined by an examination of the path of the gesture. A multi-dimensional array of input sensors 510 such as with the array 500 allows the controller 106 to more accurately determine the curve of the motion of the gesture on the surface of the array 500. The curve of the launching motion of a gesture is determined by the controller 106 to calculate the intended trajectory. For example, the straighter the launch in the actual gesture indicates a more linear intended trajectory. If the path of the actual gesture detected is more curved, the intended trajectory is deemed to be closer to the curve of the initial path of the gesture.

Similarly, the intended trajectory can be calculated based on the distance of the gesture on the multi-point touch array 102 or 500 and the amount of space the arc formed by the actual gesture occupies.

The local controller 106 can be instructed to determine when an actual gesture has been aborted and therefore not require interpretation. For example, if a player's gesture is decelerated rapidly at the end of the motion according to a predetermined threshold, the controller 42 or 106 can determine that the player did not intend to make the gesture and cancel the further process of interpreting the gesture. In addition, if a player breaks contact with the sensors 110 in the multi-touch sensor array 102 or the sensors 510 in the sensor array 500, the controller 42 or 106 can make the determination that the gesture input has been canceled by the player.

In an implementation that includes the sensing array 102 in FIG. 2, the surface of the multi-touch sensing array 102 can include graphics that indicate the zones of release or a point of release to assist the players. The surface of the multi-touch sensing array 102 can also include a physical structure such as a raised detent that indicates to the player when to release an object image such as a coin in the gesture motion. Of course, if the multi-touch surface is integrated in the display area 14, such as the array 500 in FIG. 5, the display area 14 can display suitable informational graphics to aid the player in making the gesture.

Figure 6C:
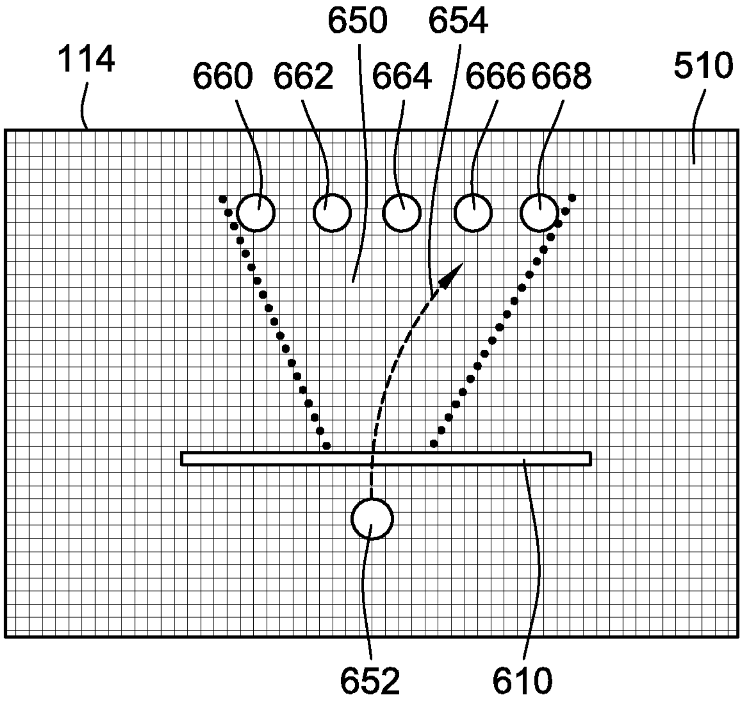
FIG. 6C is a display image of a multi-touch interface that may be used in game play to make a game selection via an input based on a player gesture.

The interpretation of the gestures can be integrated into game play. For example, the player can use a gesture such as inserting a coin to input a wager in the gaming terminal 10 to play a wagering game thereon. A gesture by the player can be used to determine an outcome of a primary or bonus game, such as by throwing or launching an object at a selection element in a wagering game. A player may also be instructed to aim an object by making a gesture at moving targets to determine game outcomes or bonus awards or other enhancement parameters, including eligibility to play a bonus game. An example is shown in FIG. 6C, which shows an image displayed in the display area 14 in conjunction with the multi-touch array 500 in FIG. 5. FIG. 6C shows the multi-touch display 500 from FIG. 5 with a cone-shaped zone of input 650. For example, the cone shape of the zone of input 650 can be defined relative to the sensors 510 in the array 500 in the zone of input 650. Any contact points of a gesture falling outside of the cone area 650 are disregarded by the controller 106 to constrain the maximum angle of the gesture. A player is directed to a ball image 652 on the display area 14 which is launched by a gesture motion represented by the dashed line 654. In this example, the player is instructed to make a gesture in a throwing motion to direct the ball 652 at a series of targets 660, 662, 664, 666 and 668. The targets 660, 662, 664, 666 and 668 represent awards that may be selected by a player via a throwing gesture for the ball 652 to hit. The target hit by the ball 652 will, for example, reveal an award amount or determine eligibility to participate in a bonus game or input a wager to play a primary wagering game or a bonus game.

Gestures that are incorporated into game play to determine outcomes can determine outcomes that enhance playability for a player. For example rather than having a single table of outcomes correlated to the gesture stored in the memory 108, multiple tables can be used. For example, a weighted table of angular values may be used for matching the gesture. Adjacent tables can be selected for the same angular value, but such tables can have different volatility, which creates greater excitement for the players. The respective expected values associated with each of the tables can be the same. To determine which weighted table to use, an initial angle of a gesture relative to a horizontal line (e.g., coincident with the line 610 in FIG. 6C), is compared against angular values in the weighted table of initial angles. If a match is found, the weighted table with the angular value is used for randomly determining game outcomes of the wagering game. Alternately, two or four weighted tables adjacent to the selected weighted table can be selected, and the optimum weighted table among the three or five weighted tables in this example can be used for randomly determining game outcomes of the wagering game.

The gaming terminal 10 can also include various sensory or haptic feedback to the player to enhance the gesture effect. As explained above, images of an object moving based on the sensed gesture can be displayed on the primary display area 14 indicating the result of the gesture. Sounds can be incorporated such as a coin-dragging sound during the gesture and stopping the sound when a release occurs in the gesture. Other sounds, such as the coin landing in an area may also be played during the gesture. Also, physical or haptic feedback in the form of a solenoid-driven motor underneath or behind the display 14 can be actuated to indicate when a coin release has occurred.

The gesture capture scheme carried out by the controller 42 or 106 can be used to assist the player in close situations. For example, the best possible throw result can be assigned to a gesture input by the controller 42 or 106. For example, the controller 106 in conjunction with the controller 42 can display graphics on the primary display area 14 to indicate the path of the intended trajectory as a result of the actual gesture to assist the player in making more accurate gestures in future plays. The controller 42 can cause an animation to be displayed in which the influenced object (such as a coin) follows a path defined by the intended gesture until the influenced object corresponds to or interacts with a target, such as the targets 660, 662, 664, 666, 668, which can correspond to wager amounts, for example.

Although some examples described above have referred to dice or coin throwing or launching gestures, in other aspects, other types of gestures are contemplated. For example, a "stir/mix" gesture is contemplated for stirring and/or mixing objects. The player uses one or more fingers to show how fast, in what direction, etc. an object is being spun and/or mixed. Additionally, a "card reveal" gesture is made by using two fingers, such as an index finger and a thumb finger, for example, to indicate a player picking up cards from a surface. Other possible gestures may include "ball toss," "dart throw," and the like. The "ball toss" and "dart throw" gestures approximate ball tossing and dart throw motions using the player's fingers. The player can control the spin direction of the ball or dart in a similar manner as with the dice throw by lifting one finger before the other finger. The player can also control the speed with which the ball or dart is thrown by controlling the speed with which the fingers are moved across the sensor array.

FIG. 7 is a flow chart of a method of determining an intended gesture from an actual gesture made in a wagering game. The method can be carried out by the controller 42, for example. The controller 42 receives gesture data indicative of an actual gesture made by a player within a defined coordinate space (e.g., 512) at a gaming terminal 10 on which a wagering game is displayed (702). The controller 42 displays in a primary display area 14 of the gaming terminal 10 an object (e.g., 140, 522, 612, 620, 652) that is influenced by a gesture (e.g., 528, 614, 622, 654) (704). The controller 42 determines from the gesture data an intended gesture that differs from the actual gesture based on a criterion (706). The controller 42 causes the object to be influenced by the intended gesture instead of the actual gesture (708). Then, the controller 42 executes a wagering game function using the influenced object as an input (710).

The criterion can include whether at least a portion of the actual gesture falls within a predefined area (e.g., 512 or below line 610). If the portion of the actual gesture falls within the predefined area, the controller 42 ignores the portion of the actual gesture in determining the intended gesture. Alternately, the criterion can include a trajectory of the actual gesture. The controller 42 calculates a tangent of a curved portion of an initial part of the gesture to determine the trajectory of the actual gesture and uses the determined trajectory as the trajectory of the intended gesture. Alternately, the criterion can include whether the actual gesture is generally straight. The controller 42 determines a linear relationship between at least two points along the actual gesture responsive to the actual gesture being generally straight and using the linear relationship to determine the intended gesture. Alternately, the criterion can include an acceleration of at least a portion of the actual gesture. The controller 42 defines defining multiple segments along the actual gesture (e.g., 630, 632, 634, 636, 638, 640) and calculates in each of the segments the acceleration of the actual gesture within the segment. The controller 42 determines in which of the segments the calculated acceleration is the highest, and determines a trajectory of the actual gesture in the segment determined to have the highest calculated acceleration. The controller 42 uses the trajectory to determine the intended gesture. Alternately, the criterion can include a change in acceleration of at least a portion of the actual gesture relative to other portions of the actual gesture. The controller 42 defines multiple segments (e.g., 630, 632, 634, 636, 638, 640) along the actual gesture and calculates in each of the segments the acceleration of the actual gesture within the segment. The controller 42 determines in which of the segments the acceleration has the highest change relative to the acceleration of the actual gesture in the other segments and determines a trajectory of the actual gesture in the segment determined to have the highest change in calculated acceleration. The controller 42 uses the trajectory to determine the intended gesture. Alternately, the criterion can include whether a characteristic of the actual gesture corresponds to value in a weighted table of values. The controller 42 selects the value in the weighted table and uses the weighted table to determine an award for the wagering game based on a randomly determined winning outcome of the wagering game. The characteristic can be an angle relative to a horizontal line (e.g., line 610) within the defined coordinate space (e.g., 512). Alternately, the criterion can include whether a characteristic of the actual gesture corresponds to value in a weighted table of values. The controller 42 can randomly select the weighted table or one of at least two weighted tables adjacent to the weighted table. Each of the weighted tables has the same expected value but a different volatility. The controller 42 can use the randomly selected weighted table to determine an award for the wagering game based on a randomly determined winning outcome of the wagering game.

The controller 42 can sense when the actual gesture has ended and coincidentally provide haptic feedback to the player who made the actual gesture to indicate that the actual gesture was received. As mentioned above, this haptic feedback can coincide with a coin release, for example. The haptic feedback can be carried out by actuating a solenoid positioned under or behind a substrate on which the actual gesture is made.

The controller 42 can display a trail of the actual gesture that persists after the actual gesture has completed and display an indication of the intended gesture overlaying the trail. The wagering game function can be accepting an amount of a wager. The controller 42, 106 can display a plurality of wager amounts on a display of the gaming terminal and display an animation in which the influenced object follows a path defined by the intended gesture until the influenced object corresponds to or interacts with a selected one of the wager amounts. The controller 42 uses the selected wager amount as a wager to play the wagering game.

The wagering game function can alternately include determining an award associated with the wagering game. The controller 42 displays multiple further objects on a display of the gaming terminal. Each of the further objects corresponds to an award to be awarded to the player when a randomly selected outcome of the wagering game satisfies a criterion. The controller 42 displays an animation in which the influenced object follows a path defined by the intended gesture until the influenced object corresponds to a selected one of the further objects. The award associated with the selected one of the further objects is awarded to the player. The award can include (a) eligibility to play a further round of the wagering game or a bonus game, (b) an amount of credits, or (c) an enhancement parameter associated with the wagering game.

Any of these algorithms include machine readable instructions for execution by: (a) a processor, (b) a controller, and/or (c) any other suitable processing device. It will be readily understood that the system 100 includes such a suitable processing device, such as the controller 42, 106. Any algorithm disclosed herein may be embodied in software stored on a tangible non-transitory medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.).

Each of these embodiments and obvious variations thereof is contemplated as falling within the spirit and scope of the claimed invention, which is set forth in the following claims.

What is claimed is:

1. A gaming terminal for playing a wagering game, the gaming terminal comprising:

a controller;

a touch surface for actuation by a player gesture associated with an input to the wagering game;

a sensor array underling the touch surface to sense the motion of the gesture, the sensor array coupled to the controller, wherein the controller:

converts the sensed motion to corresponding gesture data indicative of the gesture made by the player, and determines from at least a portion of the gesture data a trajectory of an intended gesture that differs from the gesture made by the player based on a criterion that includes an acceleration of at least a portion of the gesture made by the player, wherein the determination of the trajectory includes breaking the gesture into segments of sensors of the sensor array underlying the touch surface, measuring the acceleration of the gesture on each segment, and determining the trajectory based on the segment having the fastest measured acceleration; and a display coupled to the controller to display movement of an object image during the wagering game based on the trajectory of the intended gesture, wherein the touch surface includes a launch boundary defining a first zone and a second zone, wherein the gesture made by the player in the first zone is sensed and the gesture made by the player in the second zone is ignored.

2. The gaming terminal of claim 1, wherein the controller determines the trajectory by the tangent of a portion of a curved path of the gesture.

3. The gaming terminal of claim 1, wherein the controller determines the trajectory based on a degree of curvature of an anticipated arc from the gesture.

4. The gaming terminal of claim 1, wherein the motion includes a pullback motion, and wherein the controller calculates the trajectory based on acceleration of the pullback motion.

5. The gaming terminal of claim 1 further comprising a memory storing the gesture data as gesture values in a table having a plurality of trajectories each associated with different set of predetermined gesture values, wherein the controller selects one of the trajectories from the table based on a comparison of the gesture values with the predetermined gesture values.

6. The gaming terminal of claim 1, wherein the trajectory is calculated based on the distance of the gesture on the touch surface and how much space an arc formed by the gesture occupies.

7. The gaming terminal of claim 1, wherein the controller determines a deceleration motion in the gesture, wherein the controller interprets the deceleration to cancel the input from the gesture.

8. The gaming terminal of claim 1, wherein the touch surface includes a defined area of the possible output in the array, and the gesture is calculated based on the sensors of the senor array in the area and all contact points of the gesture outside the area are disregarded to constrain the maximum angle of the gesture.

9. A method of determining an intended gesture from an actual gesture made in a wagering game, comprising:

receiving, using a controller, gesture data indicative of an actual gesture made by a player within a defined coordinate space at a gaming terminal on which a wagering game is displayed;

displaying on the gaming terminal an object that is influenced by a gesture;

determining, using the controller or another controller, from at least a portion of the gesture data an intended gesture that differs from the actual gesture based on a criterion;

causing, using the controller or another controller, the object to be influenced by the intended gesture instead of the actual gesture and responsive to the causing, executing a wagering game function using the influenced object as an input, wherein the criterion includes an acceleration of at least a portion of the actual gesture, the determining including:

defining a plurality of segments along the actual gesture;

calculating in each of the segments the acceleration of the actual gesture within the segment;

determining in which of the segments the calculated acceleration is the highest;

determining a trajectory of the actual gesture in the segment determined to have the highest calculated acceleration; and using the trajectory to determine the intended gesture; and wherein the touch interface includes a launch boundary defining a first zone and a second zone, wherein the gesture in the first zone is sensed and the gesture in the second zone is ignored.

10. The method of claim 9, the trajectory being determined by calculating a tangent of a curved portion of an initial part of the gesture.

11. The method of claim 9, wherein the criterion includes whether the actual gesture is generally straight, the determining including determining a linear relationship between at least two points along the actual gesture responsive to the actual gesture being generally straight and using the linear relationship to determine the intended gesture.

12. The method of claim 9, wherein the criterion includes whether a characteristic of the actual gesture corresponds to value in a weighted table of values, the method further comprising:

selecting the value in the weighted table; and using the weighted table to determine an award for the wagering game based on a randomly determined winning outcome of the wagering game.

13. The method of claim 9, wherein the criterion includes whether a characteristic of the actual gesture corresponds to value in a weighted table of values, the method further comprising:

randomly selecting the weighted table or one of at least two weighted tables adjacent to the weighted table, wherein each of the weighted table and the at least two weighted tables has the same expected value but a different volatility; and using the randomly selected weighted table to determine an award for the wagering game based on a randomly determined winning outcome of the wagering game.

14. The method of claim 9, further comprising:

displaying a trail of the actual gesture that persists after the actual gesture has completed; and displaying an indication of the intended gesture overlaying the trail.

15. The method of claim 9, wherein the wagering game function includes determining an award associated with the wagering game, the method further comprising:

displaying a plurality of further objects on a display of the gaming terminal, each of the further objects corresponding to an award to be awarded to the player responsive to a randomly selected outcome of the wagering game satisfying a criterion;

displaying an animation in which the influenced object follows a path defined by the intended gesture until the influenced object corresponds to a selected one of the further objects; and awarding the player the award associated with the selected one of the further objects.

16. A computer program product comprising a non-transitory computer readable medium having an instruction set borne thereby, the instruction set being configured to cause, upon execution by a controller, the acts of:

receiving gesture data indicative of an actual gesture made by a player within a defined coordinate space at a gaming terminal on which a wagering game is displayed;

displaying on the gaming terminal an object that is influenced by a gesture;

determining from at least a portion of the gesture data an intended gesture that differs from the actual gesture based on a criterion;

causing the object to be influenced by the intended gesture instead of the actual gesture and responsive to the causing, executing a wagering game function using the influenced object as an input, wherein the criterion includes an acceleration of at least a portion of the actual gesture, the determining including:

defining a plurality of segments along the actual gesture;

calculating in each of the segments the acceleration of the actual gesture within the segment;

determining in which of the segments the calculated acceleration is the highest;

determining a trajectory of the actual gesture in the segment determined to have the highest calculated acceleration; and using the trajectory to determine the intended gesture; and wherein the touch interface includes a launch boundary defining a first zone and a second zone, wherein the gesture within the first zone is sensed and the gesture within the second zone is ignored.

17. The product of claim 16, wherein the criterion includes whether a characteristic of the actual gesture corresponds to value in a weighted table of values, the instruction set being further configured to cause the acts of:

selecting the value in the weighted table; and using the weighted table to determine an award for the wagering game based on a randomly determined winning outcome of the wagering game.

18. The product of claim 16, wherein the criterion includes whether a characteristic of the actual gesture corresponds to value in a weighted table of values, the instruction set being further configured to cause the acts of:

randomly selecting the weighted table or one of at least two weighted tables adjacent to the weighted table, wherein each of the weighted table and the at least two weighted tables has the same expected value but a different volatility; and using the randomly selected weighted table to determine an award for the wagering game based on a randomly determined winning outcome of the wagering game.

19. The product of claim 16, wherein the wagering game function includes determining an award associated with the wagering game, the instruction set being further configured to cause the acts of:

displaying a plurality of further objects on a display of the gaming terminal, each of the further objects corresponding to an award to be awarded to the player responsive to a randomly selected outcome of the wagering game satisfying a criterion;

displaying an animation in which the influenced object follows a path defined by the intended gesture until the influenced object corresponds to a selected one of the further objects; and awarding the player the award associated with the selected one of the further objects.

* * * * *